(12) United States Patent
McCarty et al.

(10) Patent No.: US 10,956,507 B2
(45) Date of Patent: Mar. 23, 2021

(54) REACTION COMPENSATED RESULT SELECTION

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 265 days.

(21) Appl. No.: 15/999,115

(22) Filed: Aug. 16, 2018

(65) Prior Publication Data

US 2020/0057823 A1   Feb. 20, 2020

(51) Int. Cl.
*G06F 16/00* (2019.01)
*G06F 16/9038* (2019.01)
*G06F 3/0484* (2013.01)
*G06F 16/438* (2019.01)
*G06F 16/9535* (2019.01)

(52) U.S. Cl.
CPC ...... *G06F 16/9038* (2019.01); *G06F 3/04842* (2013.01); *G06F 16/438* (2019.01); *G06F 16/9535* (2019.01)

(58) Field of Classification Search
CPC ............... G06F 16/9038; G06F 16/438; G06F 16/9535; G06F 16/00; G06F 17/3005; G06F 17/30867; G06F 17/30991; G06F 17/30; G06F 3/04842; G06F 3/0484; G06F 3/0148; G06F 3/0236; G06F 3/0418; G06F 3/0237; G06F 3/04886; G06F 3/04883; G06F 3/0482; G06F 16/214; G06F 16/278; G06F 16/285
See application file for complete search history.

(56) References Cited

U.S. PATENT DOCUMENTS

| | | | |
|---|---|---|---|
| 7,165,098 B1 | 1/2007 | Boyer | |
| 7,761,892 B2 | 7/2010 | Ellis | |
| 8,046,801 B2 | 10/2011 | Ellis | |
| 9,104,759 B1 * | 8/2015 | Gilder | G06F 16/951 |
| 2002/0174430 A1 | 11/2002 | Ellis | |
| 2003/0220820 A1 * | 11/2003 | Sears | G16H 40/63 705/3 |
| 2005/0251827 A1 | 11/2005 | Ellis | |
| 2008/0091548 A1 * | 4/2008 | Kotas | G06Q 30/0625 705/14.69 |

(Continued)

*Primary Examiner* — Anh Ly
(74) *Attorney, Agent, or Firm* — Haley Guiliano LLP

(57) ABSTRACT

Systems and methods for determining an intended user selection of a search result. For example, a system may display a first set of search results, including a first search result, and thereafter replace display of the first set of search results with a second set of search results, including a second search result. The system may receive selection of the second search result. If the selection of the second search result was received shortly after display of the second set of search results replaced the first set of search results, the system may update the selection from the second search result to the first search result. For example, if selection of the second search result occurred shortly after display of the second search result replaced the first search result, the system may determine that the user intended to select the first search result but inadvertently selected the second search result.

20 Claims, 11 Drawing Sheets

(56) References Cited

U.S. PATENT DOCUMENTS

| | | | | |
|---|---|---|---|---|
| 2012/0296926 A1* | 11/2012 | Kalin | ............... | G06F 16/951 |
| | | | | 707/765 |
| 2013/0091170 A1* | 4/2013 | Zhang | ............. | G06Q 10/06313 |
| | | | | 707/783 |
| 2013/0096972 A1* | 4/2013 | Podgurny | ............ | G06Q 10/105 |
| | | | | 705/7.15 |
| 2014/0198055 A1* | 7/2014 | Barkway | ............. | G06F 3/04883 |
| | | | | 345/173 |
| 2015/0006310 A1* | 1/2015 | Murugappan | ......... | G06Q 30/08 |
| | | | | 705/26.3 |
| 2015/0254353 A1* | 9/2015 | Gulwani | .......... | G06F 16/90344 |
| | | | | 707/706 |
| 2016/0165032 A1* | 6/2016 | Chang | ................... | H04L 67/142 |
| | | | | 455/566 |
| 2016/0335454 A1* | 11/2016 | Choe | ................... | G06O 30/018 |
| 2017/0046436 A1* | 2/2017 | Glover | ............... | G06F 16/9566 |
| 2018/0349021 A1* | 12/2018 | Rubalcava | ............. | G06F 3/167 |

* cited by examiner

REACTION COMPENSATED RESULT SELECTION

BACKGROUND

In the related art, in response to a search query, a system may display on an interface a first set of search results based on the query, and thereafter display on the interface an updated set of search results based on the query. For example, the system may replace the display of the first set of search results with display of an updated set of search results. In some instances, the updated set of search results may replace the first set of search results just before or while a user is trying to select a search result from the first set of search results. As a result, although the user may intend to select one of the first set of search results, the user may inadvertently select a search result from the updated set of search results.

SUMMARY

Systems and methods are thus described that address the limitations of conventional search applications and engines, specifically for providing stability to systems that display search results on an interface asynchronously. The disclosed systems and methods may be particularly advantageous in cases in which a system receives more than one set of search results in series. For example, in response to receiving user input, a system may receive a first set of search results, and may thereafter receive a second set of search results. As an example, suppose the system, in response to receiving search input, queries both local and remote data sources. It may take less time for the system to receive search results from the local data source than it takes to receive search results from the remote data source. Thus, the system may receive the first set of search results from the local data source, and thereafter receive the second set of search results from the remote data source.

The system may display on an interface the first set of search results and then replace display of the first set with display of a second set of search results. For example, the system may receive the first set of search results from the local data source, display the first set of search results on the interface, and subsequently receive the second set of search results from the remote data source. Upon receiving the second set of search results, the system may replace on the interface display of the first set of search results with display of the second set of search results.

While the system may display the second set of search results only a short time (e.g., less than one second) after displaying the first set of search results, the lack of synchronization may nonetheless be problematic. For example, the replacement of search results on the interface may disrupt a user selection of a search result.

For instance, suppose that the system displays a first search result in a position on the interface, and then replaces display of the first search result with display of a second search result in the same position. Suppose also that very soon after the system replaces display of the first result with display of the second search result (e.g., 0.5 seconds), the system receives a user selection of the second search result. The user may have intended to select the first search result, but accidentally selected the second search result. For example, in cases in which the interface is displayed on a touchscreen or touch-sensitive display, the user may have been selecting the first search result by moving his/her finger towards the position on the interface displaying the first search result, but just as the user was about to touch the position, display of the first search result was replaced with display of the second search result. Traditional systems do not take into account the sudden change in display of search results. Thus, traditional systems may leave the user with an incorrect selection (e.g., selection of the second search result instead of the first search result). When traditional systems leave the user with an incorrect search result, the user often must go back through the entire search process, sometimes even several times, in order to successfully select his/her preferred search result. Thus, the above-described deficiencies in traditional systems not only frustrate the user, but also result in inefficient system operation.

Therefore, systems and methods are described that address instabilities occurring in systems when search results are displayed asynchronously on an interface.

The present disclosure may be applied to any suitable search application or engine (e.g., a web search engine, text search, predictive selection, look-ahead typing, document search, game console search). In one embodiment of the disclosure, the search application is a media guidance application having a search feature.

The systems and methods may help prevent a user from inadvertently selecting a different search result different from the search result he/she intends to select. Suppose that a user enters user input for a search query. The systems and methods may display on an interface a first set of search results, and then replace the first set with a second set of search results. The second set of search results may be displayed on the interface just before or while the user is trying to select one of the first set of search results. Thus, although the user may intend to select a first search result from the first set, the user may inadvertently select a second search result from the second set. Thus, the disclosed systems and methods may help determine whether the user intended to select the first search result or the second search result. For example, if the user's selection of the second search result occurred shortly after (e.g., immediately after) the second search result replaced the first search result, it may indicate that the user intended to select the first search result. Thus, the disclosed systems and methods may determine a time between when the second search result replaced the first search result and when the user made the selection of the second search results. If the time is less than a certain threshold time, then it may be determined that the user intended to select the first search result instead of the second search result. Thus, the systems and methods may update the selection from the second search result to the first search result.

In some aspects, a search application may receive user input via a user equipment. Suppose that a user wishes to watch video content that is an adaptation of a Dr. Seuss story, so the user enters user input for "Dr. Seuss" on a user equipment. In response to receiving the user input, the search application may generate for display on an interface a first set of search results. For example, upon receiving the search input for Dr. Seuss, the user equipment may display search results for Dr. Seuss videos. As an example, each Dr. Seuss video that is retrieved from the search may be represented by a graphical icon (e.g., a thumbnail). The search application may generate for display each of the first set of search results within a respective position of a plurality of positions on the interface. For example, the graphical icons may be presented in a row extending across the interface. The first set of search results may include a first search result that is displayed in a first position of the plurality of positions. Suppose that a first search result is the movie The Grinch. In scenarios in which the graphical icons are displayed as a row extending across the interface, a graphical icon representing The Grinch may be displayed on a far left end of the row.

The search application may replace display of the first set of search results with display of a second set of search results. For example, the search application may receive an updated, second set of search results. For example, the second set of search results may include a more robust set of search results for Dr. Seuss video content. As an example, the first set of search results may include only movies based on Dr. Seuss stories, and the second set of search results may include both movies and television specials that feature adaptations of Dr. Seuss stories. The search application may generate for display on the interface the second set of search results. For instance, each of the second set of Dr. Seuss videos may be represented by a graphical icon. The second set of search results may include a second search result that is displayed in the first position on the interface. Suppose that the second search result is the television special "Dr. Seuss on the Loose." A graphical icon for Dr. Seuss on the Loose may be displayed on the interface in a location similar to where the icon for The Grinch was previously displayed. For example, the search application may display the second set of search results as a row of graphical icons, and the graphical icon for Dr. Seuss on the Loose may be displayed on the far left end of the other row of graphical icons. For instance, upon updating the first set of search results with a second set of search results, the graphical icon for The Grinch may be replaced with a graphical icon for Dr. Seuss on the Loose in the same position of the interface. For example, the search application may first generate for display the icon for The Grinch on the far left end of the row (when displaying the first set of search results), and then replace the icon for The Grinch with an icon for Dr. Seuss on the Loose on the far left end of the row (when displaying the second set of search results).

The search application may receive a selection for the second search result while the second search result is displayed in the first position. For example, suppose that a user touches the graphical icon for Dr. Seuss on the Loose while the icon is displayed on the far left end of the row. Since icons for both The Grinch and Dr. Seuss on the Loose were displayed in the similar position of the interface, the search application may determine whether the user intended to select Dr. Seuss on the Loose or The Grinch. For example, the search application may determine a time duration between generating for display the second set of search results and receiving the selection input. The search application may then determine whether the time duration is less than a threshold time. Suppose that the user touched the graphical icon for Dr. Seuss on the Loose 0.5 seconds after the second set of search results were generated for display. This could indicate that the user intended to select The Grinch, but inadvertently touched the icon for Dr. Seuss on the Loose. For example, the user may have seen the icon for The Grinch on the display and moved his/her finger to the display to touch the icon for The Grinch, but just has he/she was about to touch the icon for The Grinch, the icon was replaced with an icon for Dr. Seuss on the Loose. The user may not have discovered the replacement of icons in time, so the user may have accidentally touched the icon for Dr. Seuss on the Loose, even though he/she intended to select The Grinch. Thus, in response to determining that the time duration is less than the threshold time, the search application may update the selection from the second search result to the first search result. For instance, if the user touched the icon for Dr. Seuss on the Loose in less than 0.7 seconds upon the icon for Dr. Seuss on the Loose replacing The Grinch, then the search application may determine that the user intended to select The Grinch instead of Dr. Seuss on the Loose.

In some embodiments, the search application may generate a query based on the user input, and may query a local data source using the generated query. The search application may receive, in response to querying the local storage, the first set of search results. For example, the search application may search local storage for video content based on Dr. Seuss stories. In response, the search application may receive from the local storage the first set of Dr. Seuss videos.

In some embodiments, the search application may transmit the generated query to a remote data source. The search application may receive, in response to transmitting the generated query, the second set of search results from the remote data source. For example, the search application may transmit the query to a remote server, such as a search data source, to obtain the second set of search results. In response, the search application may receive from the remote data source the second set of Dr. Seuss videos.

In some embodiments, in updating the second search result with the first search result, the search application may utilize information that may be indicative of the user's preferences, for example, to determine whether the user intended to select the first or the second search result. For example, the search application may consider information stored in a user profile associated with the user. For instance, the search application may generate a first profile correlation between the first search result and a user profile, generate a second profile correlation between the second search result and the user profile, and determine that the first profile correlation is greater than the second profile correlation. The search application may modify a data structure representing the selection to indicate that the first search result is selected. Suppose the user's profile indicates that the user was born in the year 2000. The search application may correlate the user's age and the original air dates of The Grinch and Dr. Seuss on the Loose videos to establish which better fits the user's profile. The Grinch, for instance, originally aired in 2018, while Dr. Seuss on the Loose originally aired in 1973. Since Dr. Seuss on the Loose originally aired many years before the user was born, and since The Grinch originally aired when the user was 18 years old, the search application may determine that there is a greater correlation with the user's profile for The Grinch than for Dr. Seuss on the Loose. Thus, the search application may determine that the user intended to select The Grinch rather than Dr. Seuss on the Loose and thus update the user's selection from The Grinch to Dr. Seuss on the Loose.

In some embodiments, in determining whether to update the selection from the second search result to the first search result, the search application may consider a context of the user input, including other input that the user equipment received within a predetermined time before receipt of the user input. For instance, the search application may generate a first context correlation between the first search result and a context of the user input, generate a second context correlation between the second search result and the context of the user input, and determine that the first context correlation is greater than the second context correlation. The context of the user input may include previous user input that was received by the search application within a predetermined time before receiving the user input. For instance, suppose that one minute before the user searched for Dr. Seuss, the user searched for "Christmas movies." The search application may determine that The Grinch is more closely correlated to the context of the user input than Dr. Seuss on the Loose, since The Grinch is a Christmas movie, while Dr. Seuss on the Loose is not a Christmas movie. Thus, the search application may determine that the user intended to select The Grinch rather than Dr. Seuss on the Loose, and thus update the user's selection from Dr. Seuss on the Loose to The Grinch.

In some embodiments, in determining whether the user intended to select the first search result or the second search result, the search application may receive confirmation from the user. For example, the search application may generate for display on the interface selection options for confirming whether the user intended to select either the first search result or the second search result, and receive user input confirming the first search result. As an example, after determining that the user's selection of Dr. Seuss on the Loose occurred within less than 0.7 seconds from generating the second set of search results, the search application may present for display on the interface a window that reads, "Do you wish to select The Grinch or Dr. Seuss on the Loose?" The user may then have the option to select either The Grinch or Dr. Seuss on the Loose. Upon the user selecting The Grinch, the search application may update the selection from Dr. Seuss on the Loose to The Grinch.

In other aspects, systems and methods may monitor motion near an interface (e.g., user activity) in order to prevent a user from inadvertently selecting a different search result than the search result he/she intends to select. For example, similar to the scenario described above, a search application may display on an interface a first set of search results, and then replace the first set with a second set of search results. The second set of search results may replace the first set of search results on the interface just before or while the user is trying to select one of the first set of search results. Thus, although the user may intend to select a first search result from the first set, the user may inadvertently select a second search result from the second set.

Thus, while the first set of search results are displayed on an interface, the search application may monitor for motion that is indicative of a user making a selection of a first search result. In response to detecting that a user is about to make a selection of the first search result, the search application may preclude the interface from replacing the first search result with the second search result. Thus, the search application may operate to prevent users from inadvertently selecting incorrect search results.

In some aspects, a search application may be a media guidance application running on a user equipment that includes search features. As described above, suppose that the user wishes to watch video content that is an adaptation of a Dr. Seuss story, so the user enters a search query for Dr. Seuss on a user equipment. In response to receiving the user input, the search application may generate a query based on the user input. The search application may query at least one data source using the generated query, and receive a first set of search results from the at least one data source based on the generated query. For example, upon receiving user input for Dr. Seuss, the search application may query a local data source for Dr. Seuss videos. The search application may receive a first set of search results from the at least one data source based on the generated query, and generate for display on an interface the first set of search results. As an example, the search application may receive a first set of Dr. Seuss videos from a local data source, and generate for display each of the first set of Dr. Seuss videos with a graphical icon (e.g., a thumbnail). The search application may monitor for motions proximate to the interface. For example, the search application may monitor for signals received from the user equipment indicating a user's finger is about to touch a graphical icon to make a selection. In some embodiments, the search application may monitor for a motion approaching the interface (e.g., monitor for an object moving in a direction that is substantially perpendicular to the surface of the display). In response to detecting that a motion proximate to the interface within a predetermined time after generating for display on the interface the first search result, the search application may preclude a second set of search results, based on the query, from being displayed on the interface. Thus, the search application may prevent the selection options from changing right before or while the user is making his/her selection. Thus, the search application may prevent the user from inadvertently selecting an incorrect search result.

In some embodiments, each of the first set of search results is displayed in a respective position of a plurality of positions on the interface, and the search application monitors for motions proximate to one of the plurality of positions.

In some embodiments, in response to receiving the user input, the search application may generate a query based on the user input. The search application may query at least one data source using the generated query. In some embodiments, the search application may generate a search query based on the user input and may search, for example, a local data source for media assets based on the search query. The search application may generate for display on the interface the first set of search results.

In some embodiments, the search application may use the generated query to query a remote data source for search results based on the search query. The search application may receive the second set of search results from the remote data source based on the generated query. In such cases, the search application may receive the second set of search results but refrain from generating for display the second set of search results in response to detecting a motion proximate to the interface.

DETAILED DESCRIPTION

Figure 1A:
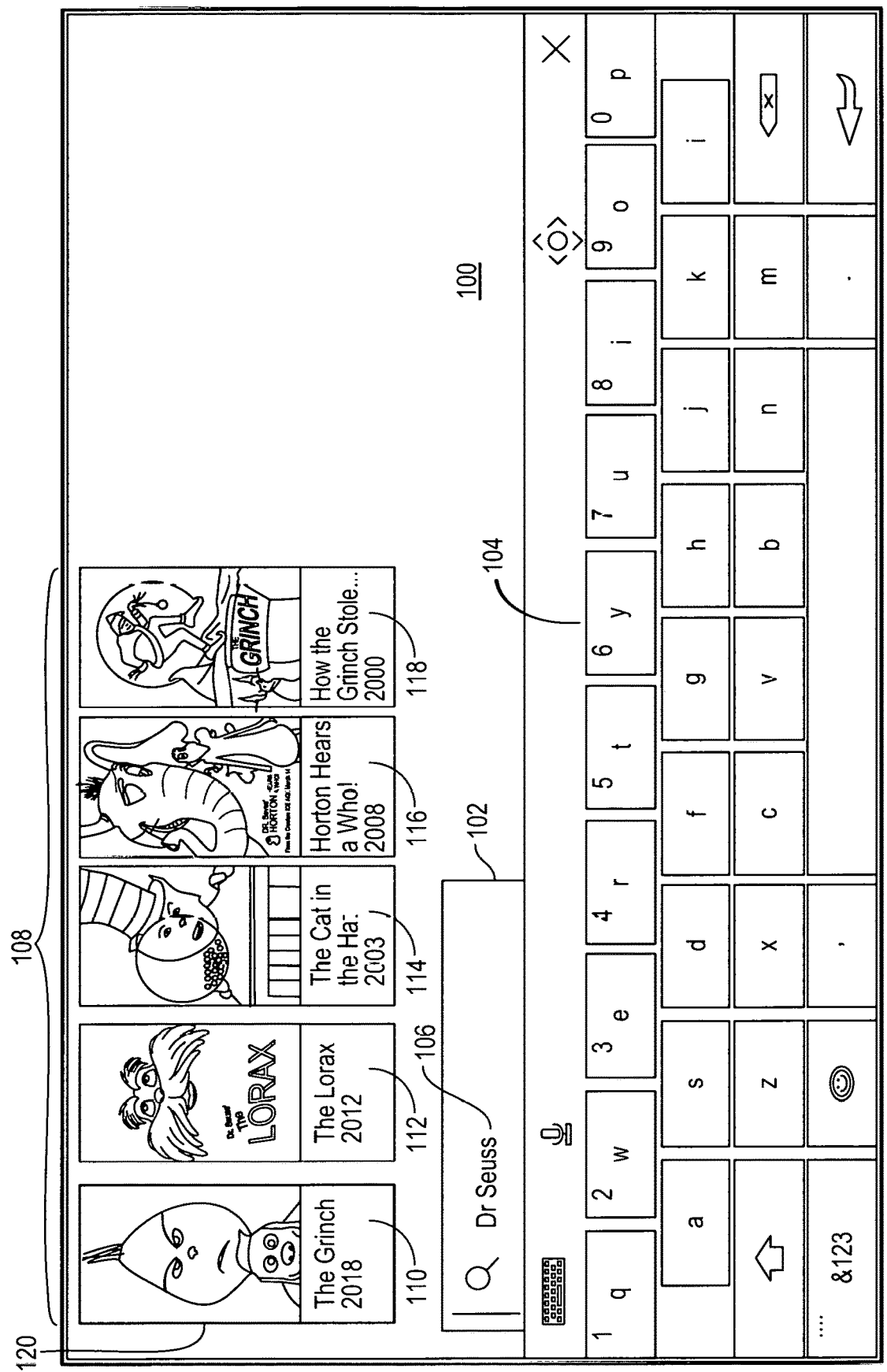
FIGS. 1A and 1B show an illustrative example of an interface displaying a search query and first and second sets of search results, respectively, in accordance with some embodiments of the disclosure.

Systems and methods are described that address the limitations of conventional search applications and engines, specifically for determining an intended user selection of a search result. The present disclosure may be applied to any suitable search application or engine (e.g., a web search engine). In one embodiment of the disclosure, the search application is a media guidance application having a search feature. For example, the amount of content available to users in any given content delivery system can be substantial. Thus, many users desire a form of media guidance through an interface that allows users to search content selections, efficiently navigate content selections, and easily present content that they may desire. An application that provides such guidance is referred to herein as an interactive media guidance application, or a media guidance application, or sometimes a guidance application.

Systems and methods are described for determining an intended user selection of a search result.

In response to a user entering user input, such as a search query, a search application may generate more than one set of search results. As one example, the search application may search, based on the user input, two different data sources. For instance, the search application may conduct a first search on a local data source, and a second search on a remote data source.

Often, the results from multiple searches are not generated simultaneously. For example, sometimes one search will be initiated after another search has been initiated. As another example, even if multiple searches are initiated simultaneously, it may take longer to generate results for one search than it takes to generate results for another search. For instance, a search of a remote data source may take longer to conduct than a search of a local data source.

Thus, a search application may generate for display a first set of search results retrieved from a first search, and then update the first set with a second set of search results retrieved from a second search. The search application may display the first set of search results, and then, upon receiving the second set of search results, replace the first set of search results with the second set of search results. When the search application replaces the first set of search results with the second set of search results, a particular position on the interface may go from displaying a first search result with a second search result. In some instances, a user may intend to select the first search result that is in the particular position, but right before the user makes the selection, the second set of search results replaces the first search result.

Traditional applications do not adequately consider whether the user intended to select the first search result or the second search result. Rather, traditional applications may just determine that the user's intended selection was the second search result. Such determinations, however, may be incorrect, since they do not account for situations in which the search results were updated right before or during the user's selection process.

Thus, systems and methods are described that address the limitations of conventional systems, specifically for determining an intended user selection of a search result.

Figure 1B:
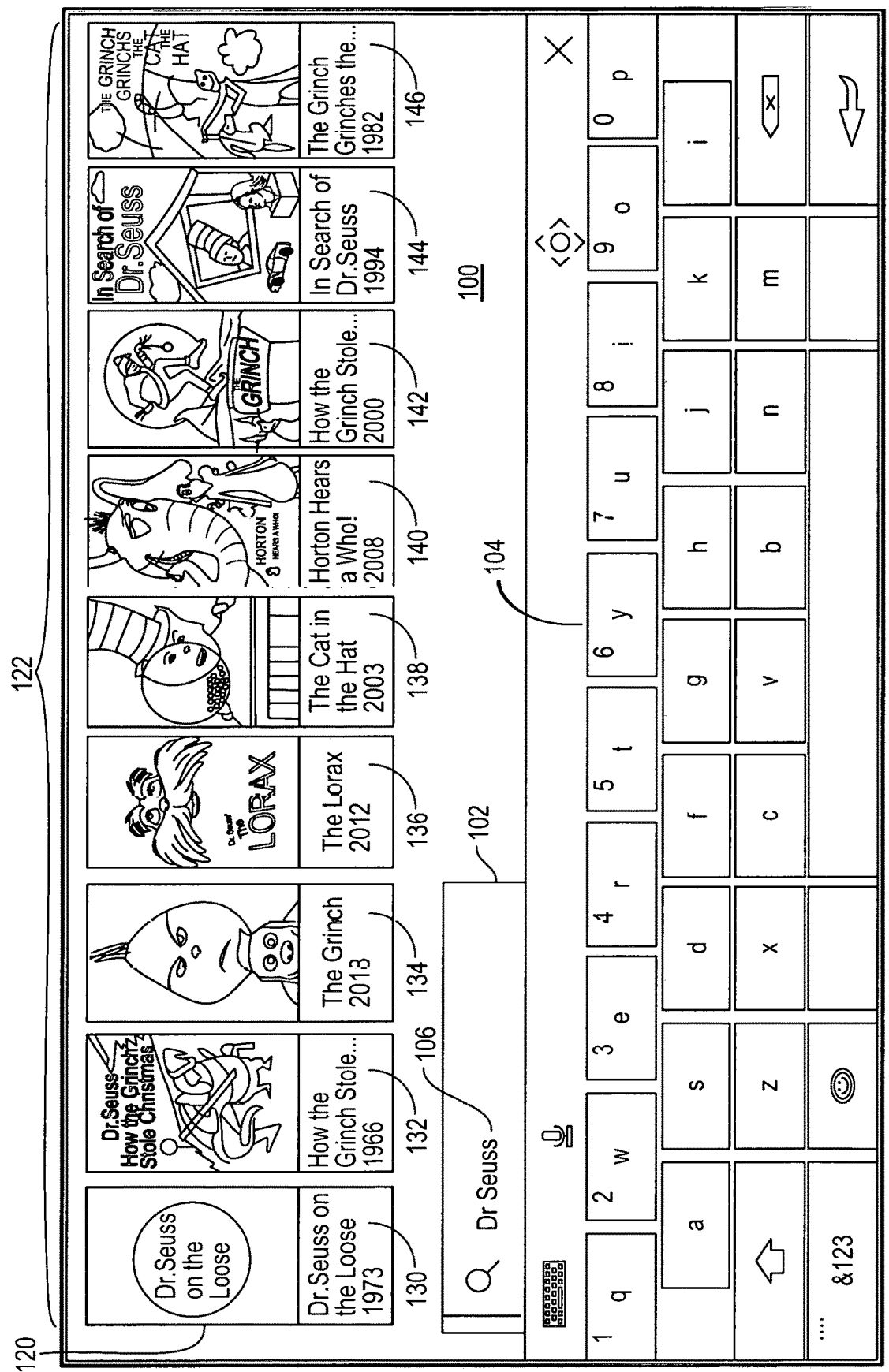

FIGS. 1A and 1B show an illustrative example of an interface 100 as provided by a search application, which may be a media guidance application. Interface 100 is shown displaying first and second sets of search results, respectively, for a query based on user input, in accordance with some embodiments of the disclosure. More particularly, FIG. 1A shows an illustrative example of an interface 100 displaying a first set of search results 108 based on user input 106, and FIG. 1B shows an illustrative example of the interface 100 displaying a second set of search results 122 for the user input 106. In some examples, a search application may receive user input 106 on a user equipment. Suppose that a user wishes to watch video content that is an adaptation of a Dr. Seuss story, so the user enters as user input 106 a search query for Dr. Seuss on a user equipment. In response to receiving the user input 106, the search application may generate for display on an interface 100 a first set of search results 108 (see FIG. 1A). For example, upon receiving the user input 106 for the search query for Dr. Seuss, the search application may present search results for Dr. Seuss videos. As an example, graphical icons 110-118 may each represent a respective Dr. Seuss video that is retrieved from the first search. The search application may generate for display a respective graphical icon 110-118 for each of the first set of search results 108 within a respective position of a plurality of positions on the interface 100. For example, each search result graphical icon 110-118 for the first set of search results 108 may be presented in a row extending across the interface 100. The first set of search result icons 110-118 may include a first search result icon 110 that is displayed in a first position 120 of the plurality of positions. Suppose that a first search result is the movie The Grinch. In scenarios in which the icons 110-118 for the first set of search results 108 are displayed as a row extending across the interface 100, a first search result icon 110 for The Grinch may be displayed in a first position 120, e.g., on a far left end of the row. While FIGS. 1A and 1B show the first position 120 to be the far left end of the row, it should be understood that the first position 120 can be any suitable position within the interface 100 while remaining within the scope of this disclosure.

The search application may replace display of the first set of search results 108 with display of a second set of search results 122 on the interface 100. For example, after generating for display on the interface 100 the first set of search results 108 (FIG. 1A), the search application may generate for display a second set of search results 122 (FIG. 1B). For example, the second set of search results 122 may include a more robust set of search results for Dr. Seuss video content, when compared to the first set of search results 108. As an example, the first set of search results 108 may include only movies based on Dr. Seuss stories, and the second set of search results 122 may include both movies and television specials that featured adaptations of Dr. Seuss stories. The search application may generate for display on the interface 100 respective search result icons 130-146 for each of the second set of search results 122. For example, each search result icon 130-146 of the second set of search results 122 may be presented in a row extending across the interface 100. The second set of search results 122 may include a second search result icon 130 that is displayed in the first position 120 on the interface 100. Suppose that the second search result is the television special Dr. Seuss on the Loose. A second search result icon 130 for Dr. Seuss on the Loose may be displayed on the interface 100 in a position 120 similar to where the first search result icon 110 for The Grinch was previously displayed. For example, the search application may display the second set of search results 122 as a row of graphical icons, and the search result icon 130 for Dr. Seuss on the Loose may be displayed on the far left end of the second row. For instance, upon updating the first set of search results 108 with a second set of search results 122, the first search result icon 110 for The Grinch may be replaced with a second search result icon 130 for Dr. Seuss on the Loose in the same position 120 of the interface 100. For instance, the search application may first display the first search result icon 110 for The Grinch on the far left end of the row (when displaying the first set of search results), and then replace the icon 110 for The Grinch with an icon 130 for Dr. Seuss on the Loose (when displaying the second set of search results).

The search application may receive a selection for the second search result while the second search result icon 130 is displayed in the first position 120. For example, suppose that the interface 100 is a touchscreen. While the graphical icon 130 for Dr. Seuss on the Loose is displayed on the far left end of the row, a user may touch the graphical icon 130, thus indicating a selection for Dr. Seuss on the Loose. As icons for The Grinch and Dr. Seuss on the Loose were both displayed in the first position 120 of the interface 100, however, the search application may determine whether the user intended to select Dr. Seuss on the Loose or The Grinch. For example, the search application may determine a time duration between generating for display the second set of search results 122 and receiving the selection input, and the search application may determine whether the time duration is less than a threshold time. Suppose that the user touched the graphical icon 130 for Dr. Seuss on the Loose only 0.5 seconds after the second set of search results were generated for display. This could indicate that the user really intended to select the first icon 110 for The Grinch, but inadvertently touched the second icon 130 for Dr. Seuss on the Loose. For example, the user may have seen the first icon 110 for The Grinch on the interface and moved his/her finger to the interface 100 to touch the first icon 110 for The Grinch, but just as he/she was about to touch the first icon 110 for The Grinch, the first icon 110 was replaced with a second icon 130 for Dr. Seuss on the Loose. The user may not have discovered the replacement from the first icon 110 to the second icon 130 in time. The user may have accidentally touched the second icon 130 for Dr. Seuss on the Loose, even though he/she intended to select the first icon 110 for The Grinch. Thus, in response to determining that the time duration is less than the threshold time, the search application may update the selection from the second search result to the first search result. For instance, if the user touched the second icon 130 for Dr. Seuss on the Loose in less than 0.7 seconds upon the search application updating the search, then the search application may determine that the user intended to select instead the icon 110 for The Grinch.

The search application may determine a threshold time through any suitable means. In some embodiments, the search application receives the threshold time from a database, through user configuration settings, and/or parameters hard-coded in the search application. In some embodiments, the threshold time is determined based on user activity. For example, if a search application running on a first person's user device receives user input more quickly than a search application running on a second person's user device (e.g., if the first person has quicker movement and/or reaction time than the second user), then the search application running on the first person's user device may establish a threshold time that is shorter than the threshold time established by the search application running on the second person's user device. Additionally or alternatively, the threshold time may be determined based on latencies for previous communications with a remote data source. For instance, if the search application receives the second set of search results from a remote data source, then the search application may establish the threshold time based on the degree of latencies it has experienced with the remote data source in previous communications (e.g., recent communications).

In some embodiments, the search application may generate a query based on the user input, and may query a local data source using the generated query. In some embodiments, the search application formulates a query, e.g., a SQL Select statement, that requests records from a database, e.g., a SQL database, where fields in the record contain information matching the user input. The search application may receive, in response to querying the local storage, the first set of search results 108. For example, the search application may search local storage for video content based on Dr. Seuss stories. In response, the search application may receive from the local storage the first set of Dr. Seuss videos 108.

In some embodiments, the search application may transmit the generated query to a remote data source. The search application may receive, in response to transmitting the generated query, the second set of search results 122 from the remote data source. For example, the search application may transmit the query to a remote server, such as a search data source, to obtain the second set of search results 122. In response, the search application may receive from the remote data source the second set of Dr. Seuss videos 122.

In some embodiments, in updating the second search result with the first search result, the search application may consider information that may be indicative of the user's preferences, for example, to determine whether the user intended to select the first search result icon 110 or the second search result icon 130. For example, the search application may consider information stored in a user profile associated with the user. User profile information may be stored in one or more of a local database, a remote database, or other suitable memories. For instance, the search application may generate a first profile correlation between the first search result and a user profile, generate a second profile correlation between the second search result and the user profile, and determine that the first profile correlation is greater than the second profile correlation. The search application may modify a data structure representing the selection to indicate that the first search result is selected. Suppose the user's profile indicates that the user was born in the year 2000. The search application may correlate the user's age and the original air dates of The Grinch and Dr. Seuss on the Loose videos to establish which better fits the user's profile. The Grinch, for instance, originally aired in 2018, while Dr. Seuss on the Loose originally aired in 1973. Since Dr. Seuss on the Loose originally aired many years before the user was born, and since The Grinch originally aired with the user was 18 years old, the search application may determine that there is a greater correlation with the user's profile for The Grinch than for Dr. Seuss on the Loose. Thus, the search application may determine that the user intended to select the icon for The Grinch 110 rather than the icon for Dr. Seuss on the Loose 130, and thus update the user's selection from Dr. Seuss on the Loose to The Grinch.

In some embodiments, in updating the second search result with the first search result, the search application may consider the context of the user input 106. The context of the user input may include previous user input that was received by the search application within a predetermined time before receiving the user input 106. For instance, the search application may generate a first context correlation between the first search result 110 and a context of the user input, generate a second context correlation between the second search result 130 and the context of the user input, and determine that the first context correlation is greater than the second context correlation. For instance, suppose that one minute before the user searched for Dr. Seuss, the user searched for Christmas movies. The search application may determine that The Grinch is more closely correlated to the context of the user input than Dr. Seuss on the Loose, since The Grinch is a Christmas movie, while Dr. Seuss on the Loose is not a Christmas movie. Thus, the search application may determine that the user intended to select the icon for The Grinch 110 rather than the icon for Dr. Seuss on the Loose 130, and thus update the user's selection from Dr. Seuss on the Loose to The Grinch.

In some embodiments, in updating the selection from the second search result to the first search result, the search application may generate for display on the interface 100 selection options for confirming whether the user intended to select either the first search result or the second search result, and receive user input confirming the first search result. As an example, after determining that the user's selection of the second icon 130 for Dr. Seuss on the Loose occurred within less than 0.7 seconds from generating the second set of search results 122, the search application may present for display on the interface 100 a window that reads, "Do you wish to select The Grinch or Dr. Seuss on the Loose?" The user may then have the option to select either The Grinch or Dr. Seuss on the Loose. Upon the user selecting The Grinch, the search application may update the selection from Dr. Seuss on the Loose to The Grinch.

Figure 2A:
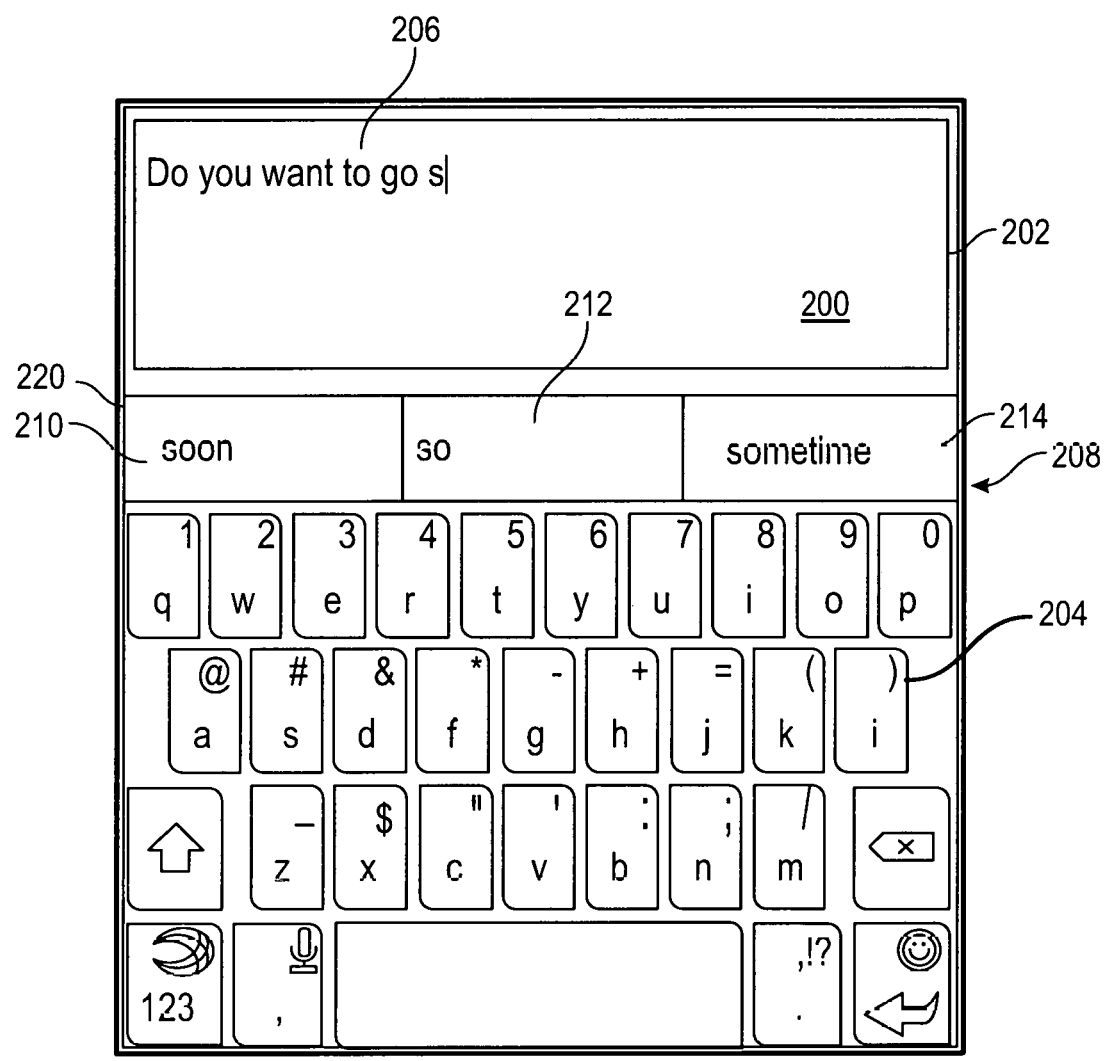
FIGS. 2A and 2B show an illustrative example of an interface displaying a search query and first and second sets of search results, respectively, in accordance with some embodiments of the disclosure.
Figure 2B:
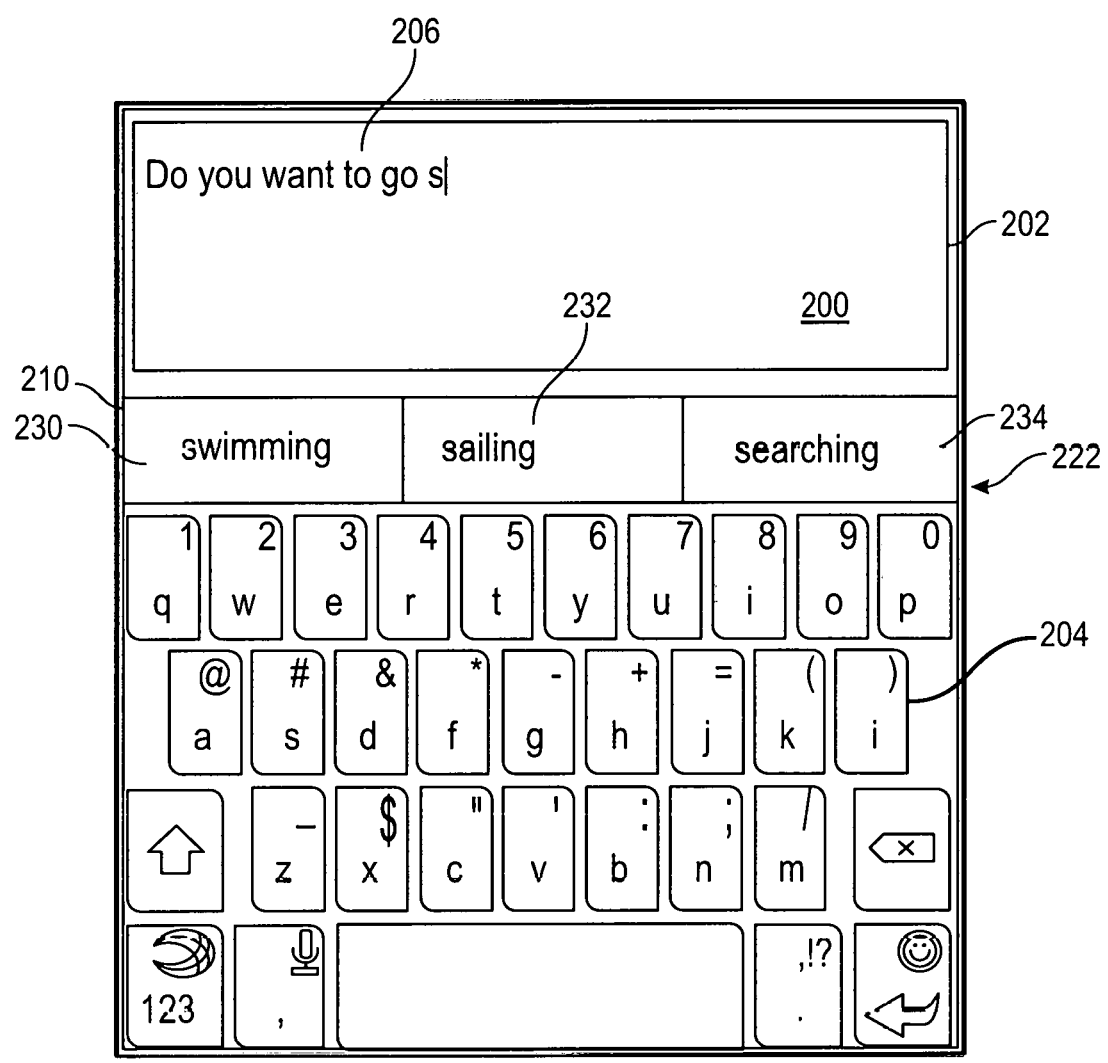

FIGS. 2A and 2B show an illustrative example of an interface 200 as provided by a search application, which may be a predictive text application. Interface 200 is shown displaying first and second sets of search results, respectively, for a predictive text search query, in accordance with some embodiments of the disclosure. More particularly, FIG. 2A shows an illustrative example of an interface 200 displaying a first set of search results 208 based on user input 206, and FIG. 2B shows an illustrative example of the interface 100 displaying a second set of search results 222 based on the user input 206. In some examples, a search application may receive user input 206 on a user equipment, such as a mobile device. Suppose that a user wants to send a text message that reads, "Do you want to go soon?" The user may enter text input 206 into text box 202, for example, using keyboard 204. In response to receiving the user input 206, "Do you want to go s" the search application may predict the following text characters by searching for relevant words starting with the letter "s." The search application may generate for display on the interface 200 a first set of search results 208 (see FIG. 2A). For example, upon receiving the user input 206 for, "Do you want to go s," the search application may present search results for various words starting with the letter "s." The search application may generate for display graphical icons 210-214 that each represent a respective one of the first set of search results 208 within a respective position of a plurality of positions on the interface 200. For example, each search result graphical icon 210-214 for the first set of search results 208 may be presented in a row extending across the interface 200. The first set of search result icons 210-214 may include a first search result icon 210 that is displayed in a first position 220 of the plurality of positions. Suppose that a first search result is the word "soon." In scenarios in which the icons 210-214 for the first set of search results 208 are displayed as a row extending across the interface 200, a first search result icon 210 for "soon" may be displayed in a first position 220, e.g., on a far left end of the row. While FIGS. 2A and 2B show the first position 220 to be the far left end of the row, it should be understood that the first position 220 can be any suitable position within the interface 200 while remaining within the scope of this disclosure.

The search application may replace display of the first set of search results 208 with display of a second set of search results 222 on the interface 200. For example, after generating for display on the interface 200 the first set of search results 208 (FIG. 2A), the search application may generate for display a second set of search results 222 (FIG. 2B). For example, the second set of search results 222 may include a different set of search results for words beginning with the letter "s." The search application may generate for display on the interface 200 respective search result icons 230-234 for each of the second set of search results 222. For example, each search result icon 230-234 of the second set of search results 222 may be displayed in a row extending across the interface 200. The second set of search results 222 may include a second search result icon 230 that is displayed in the first position 220 on the interface 200. Suppose that the second search result 220 is the word, "swimming." A second search result icon 230 for "swimming" may be displayed on the interface 200 in a position 220 similar to where the first search result icon 220 for "soon" was previously displayed. For example, the search application may display the second set of search results 222 as a second row of graphical icons, and the search result icon 230 for "soon" may be displayed on the far left end of the second row. For instance, upon updating the first set of search results 208 with a second set of search results 222, the first search result icon 210 for "soon" may be replaced with a second search result icon 230 for "swimming" in the same position 220 of the interface 200. For instance, the search application may first display the first search result icon 210 for "soon" on the far left end of the row (when displaying the first set of search results), and then replace the icon 210 for "soon" with an icon 230 for "swimming" (when displaying the second set of search results).

The search application may receive a selection of the second search result icon 230 while the second search result icon 230 is displayed in the first position 220. For example, suppose that the interface 200 is a touchscreen. A user may touch the second search result icon 210 for "swimming" in the first position 220 of the interface. Since "soon" and "swimming" were both displayed in the first position 220 of the interface 200, the search application may determine whether the user intended to select "swimming" or "soon." For example, the search application may determine a time duration between generating for display the second set of search results 222 and receiving the selection input, and the search application may determine whether the time duration is less than a threshold time. Suppose that the user touched the graphical icon 230 for "swimming" only 0.5 seconds after the second set of search results were generated for display. This could indicate that the user intended to select the first icon 210 for "soon," but inadvertently touched the second icon 230 for "swimming." For example, the user may have been moving his/her finger to the interface 200 to touch the first icon 210 for "soon," but just has he/she was about to touch the first icon 210 for "soon," the first icon 210 was replaced with a second icon 230 for "swimming." The user may not have discovered the replacement from the first icon 210 to the second icon 230 in time. The user may have accidentally touched the second icon 230 for "swimming," even though he/she intended to select the first icon 210 for "soon." Thus, in response to determining that the time duration is less than the threshold time, the search application may update the selection from the second search result to the first search result. For instance, it the user touched the second icon 230 for "swimming" in less than 0.7 seconds upon the search application updating the search, then the search application may determine that the user intended to select instead the icon 210 for "soon."

In some embodiments, the search application may generate a query based on the user input, and may query a local data source using the generated query. The search application may receive, in response to querying the local storage, the first set of search results 208. For example, the search application may search local storage for words starting with the letter "s." In response, the search application may receive from the local storage the first set of search results 208.

In some embodiments, the search application may transmit the generated query to a remote data source. The search application may receive, in response to transmitting the generated query, the second set of search results 222 from the remote data source. For example, the search application may transmit the query to a remote server, such as a search data source, to obtain the second set of search results 222. In response, the search application may receive from the remote data source the second set of words starting with the letter "s."

In some embodiments, in updating the second search result 230 with the first search result 210, the search application may consider information that may be indicative of the user's preferences, for example, to determine whether the user intended to select the first search result or the second search result. For example, the search application may generate a first profile correlation between the first search result and a user profile, generate a second profile correlation between the second search result and the user profile, and determine that the first profile correlation is greater than the second profile correlation. Suppose that a group of phrases frequently sent via text message by the user are stored in the user's user profile. Suppose also that this group of phrases includes the phrase "Do you want to go soon," and does not include the phrase "Do you want to go swimming." The search application may determine that the user intended to select the first icon 210 for "soon" rather than the second icon 230 for "swimming," and thus update the user's selection from "swimming" to "soon."

In some embodiments, in updating the second search result 230 with the first search result 210, the search application may consider the context of the user input 206. The context of the user input may include contextual user input that was previously received by the search application within a predetermined time before receiving the user input 206. The search application may determine contextual user input in any suitable way, for example, by receiving the contextual information from a database, through user configuration settings, through parameters that are hard-coded in the search application, etc. The search application may generate a first context correlation between the first search result and a context of the user input, generate a second context correlation between the second search result and the context of the user input, and determine that the first context correlation is greater than the second context correlation. For instance, suppose that minutes before the user entered "Do you want to go s," the user sent other messages pertaining to time and scheduling. The search application may determine that "soon" is more closely correlated to the context of the user input than "swimming," since "Do you want to go soon" pertains to time and scheduling. Thus, the search application may determine that the user intended to select the first icon 210 for "soon" rather than the second icon 230 for "swimming," and thus update the user's selection from "swimming" to "soon."

In some embodiments, in updating the selection from the second search result to the first search result, the search application may generate for display on the interface 200 selection options for confirming whether the user intended to select either the first search result or the second search result, and receive user input confirming the first search result. As an example, after determining that the user's selection of the second icon 230 for "swimming" occurred within less than 0.7 seconds from generating the second set of search results 222, the search application may present for display on the interface 200 a window that reads, "Do you wish to select soon or swimming?" The user may then have the option to select either soon or swimming. Upon the user selecting soon, the search application may update the selection from swimming to soon.

In certain embodiments of the disclosure, the search application is a media guidance application having a search feature. Media guidance applications may generate graphical user interface screens that enable a user to navigate among, locate, and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, text words and characters, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The search application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The search applications and media guidance applications may be provided as on-line applications (i.e., provided on a web-site), or as stand-alone applications or clients on user equipment devices. Various devices and platforms that may implement search applications are described in more detail below.

One of the functions of the search application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The search application may be personalized based on a user's preferences. A personalized search application allows a user to customize displays and features to create a personalized "experience" with the search applications. This personalized experience may be created by allowing a user to input these customizations and/or by the search application monitoring user activity to determine various user preferences. Users may access their personalized search application by logging in or otherwise identifying themselves to the search application. Customization of the search applications may be made in accordance with a user profile. For example, in the context of search application that are media guidance applications, the customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The search applications may allow a user to provide user profile information or may automatically compile user profile information. The search applications may, for example, monitor the content the user accesses and/or other interactions the user may have with the search application. Additionally, the search applications may obtain all or part of other user profiles that are related to a particular user (e.g., from other web sites on the Internet the user accesses, such as www.Tivo.com, from other search and/or guidance applications the user accesses, from other interactive applications the user accesses, from another user equipment device of the user, etc.), and/or obtain information about the user from other sources that the search application may access. As a result, a user can be provided with a unified search application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 3:
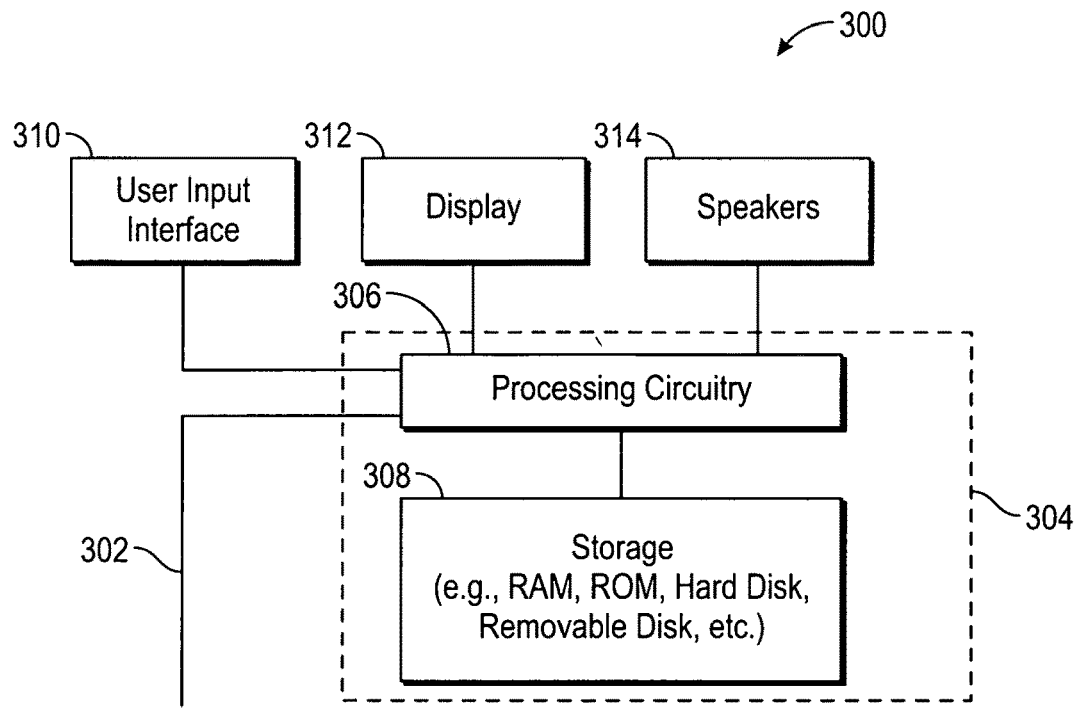
FIG. 3 is a block diagram of an illustrative user equipment device in accordance with some embodiments of the disclosure.

Users may access content and the search application, and one or more other applications into which the search application is incorporated (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a search application stored in memory (i.e., storage 308). Specifically, control circuitry 304 may be instructed by the search application to perform the functions discussed above and below. For example, the search application may provide instructions to control circuitry 304 to generate the search displays. In some implementations, any action performed by control circuitry 304 may be based on instructions received from the search application.

In client-server based embodiments, control circuitry 304 may include communications circuitry suitable for communicating with a search application server or other networks or servers. The instructions for carrying out the above-mentioned functionality may be stored on the search application server. Communications circuitry may include a cable modem, an integrated services digital network (ISDN) modem, a digital subscriber line (DSL) modem, a telephone modem, Ethernet card, or d wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive search application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The search application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the search application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the search and/or media guidance application is downloaded and interpreted or otherwise run by an interpreter or virtual machine (run by control circuitry 304). In some embodiments, the search and/or media guidance application may be encoded in the ETV Binary Interchange Format (EBIF), received by control circuitry 304 as part of a suitable feed, and interpreted by a user agent running on control circuitry 304. For example, the search and/or media guidance application may be an EBIF application. In some embodiments, the search and/or media guidance application may be defined by a series of JAVA-based files that are received and run by a local virtual machine or other suitable middleware executed by control circuitry 304. In some of such embodiments (e.g., those employing MPEG-2 or other digital media encoding schemes), the search and/or media guidance application may be, for example, encoded and transmitted in an MPEG-2 object carousel with the MPEG audio and video packets of a program.

Figure 4:
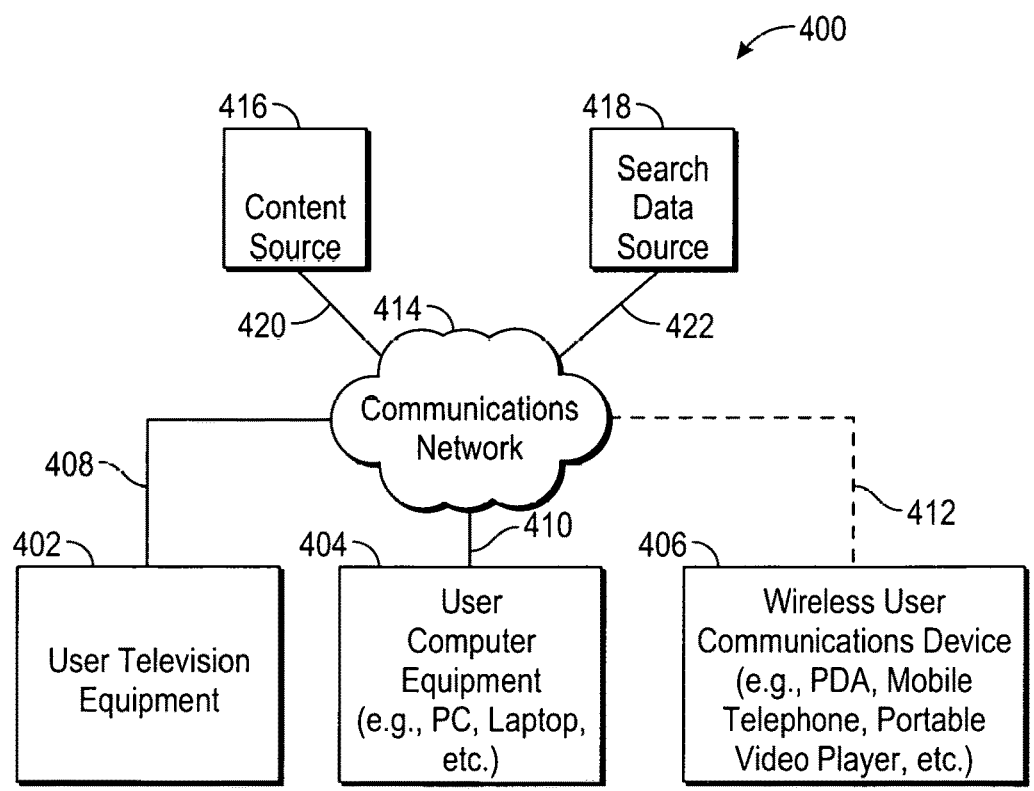
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a search application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The search application may have the same layout on various different types of user equipment or may be tailored to the display capabilities of the user equipment. For example, on user computer equipment 404, the search and/or media guidance application may be provided as a web site accessed by a web browser. In another example, the search and/or media guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent search application settings across in-home devices and remote devices. Settings include those described herein, as well as channel and program favorites, programming preferences that the guidance application utilizes to make programming recommendations, display preferences, and other desirable guidance settings. For example, in cases in which the search application is a media guidance application, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the search application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and data source 418 coupled to communications network 414 via communication paths 420 and 422, respectively. Paths 420 and 422 may include any of the communication paths described above in connection with paths 408, 410, and 412. Communications with the content source 416 and data source 418 may be exchanged over one or more communications paths, but are shown as a single path in FIG. 4 to avoid overcomplicating the drawing. In addition, there may be more than one of each of content source 416 and data source 418, but only one of each is shown in FIG. 4 to avoid overcomplicating the drawing. (The different types of each of these sources are discussed below.) If desired, content source 416 and data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Data source 418 may provide search data, such as the search data described above. Search data may be provided to the user equipment devices using any suitable approach. In instances in which search data includes media data, in some embodiments, the search application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, search data (e.g., media guidance data) from search data source 418 may be provided to user's equipment using a client-server approach. For example, a user equipment device may pull the data from a server, or a server may push media guidance data to a user equipment device. In some embodiments, a search application client residing on the user's equipment may initiate sessions with source 418 to obtain the search data (e.g., guidance data) when needed, e.g., when the guidance data is out of date or when the user equipment device receives a request from the user to receive data. The search data (e.g., media guidance data) may be provided to the user equipment with any suitable frequency (e.g., continuously, daily, a user-specified period of time, a system-specified period of time, in response to a request from user equipment, etc.). Search data source 418 may provide user equipment devices 402, 404, and 406 the search application itself or software updates for the search application.

In some embodiments, the search data may include media guidance data, including viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the search application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the search application may generate promotions that entice the user to keep the particular service or source indicated by the score as one to which the user will likely terminate access.

Search applications may be, for example, stand-alone applications implemented on user equipment devices. For example, the search application may be implemented as software or a set of executable instructions which may be stored in storage 308, and executed by control circuitry 304 of a user equipment device 300. In some embodiments, search applications may be client-server applications where only a client application resides on the user equipment device, and server application resides on a remote server. For example, search applications may be implemented partially as a client application on control circuitry 304 of user equipment device 300 and partially on a remote server as a server application (e.g., search data source 418) running on control circuitry of the remote server. When executed by control circuitry of the remote server (such as search data source 418), the search application may instruct the control circuitry to generate the guidance application displays and transmit the generated displays to the user equipment devices. The server application may instruct the control circuitry of the search data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute search applications (e.g., web-based applications or cloud-based applications), or the content can be displayed by search applications stored on the user equipment device.

Search system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering search results, such as content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access search content and obtain media guidance. For example, some users may have home networks that are accessed by in-home and mobile devices. Users may control in-home devices via a search application implemented on a remote device. For example, users may access an online search application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a search application on the user's in-home equipment. Various systems and methods for user equipment devices communicating, where the user equipment devices are in locations remote from each other, is discussed in, for example, Ellis et al., U.S. Pat. No. 8,046,001, issued Oct. 25, 2011, which is hereby incorporated by reference herein in its entirety.

In a third approach, users of user equipment devices inside and outside a home can use their search application to communicate directly with content source 416 to access content, such as media content. Specifically, within a home, users of user television equipment 402 and user computer equipment 404 may access the search application to navigate among and locate desirable content. Users may also access the search application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a search application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
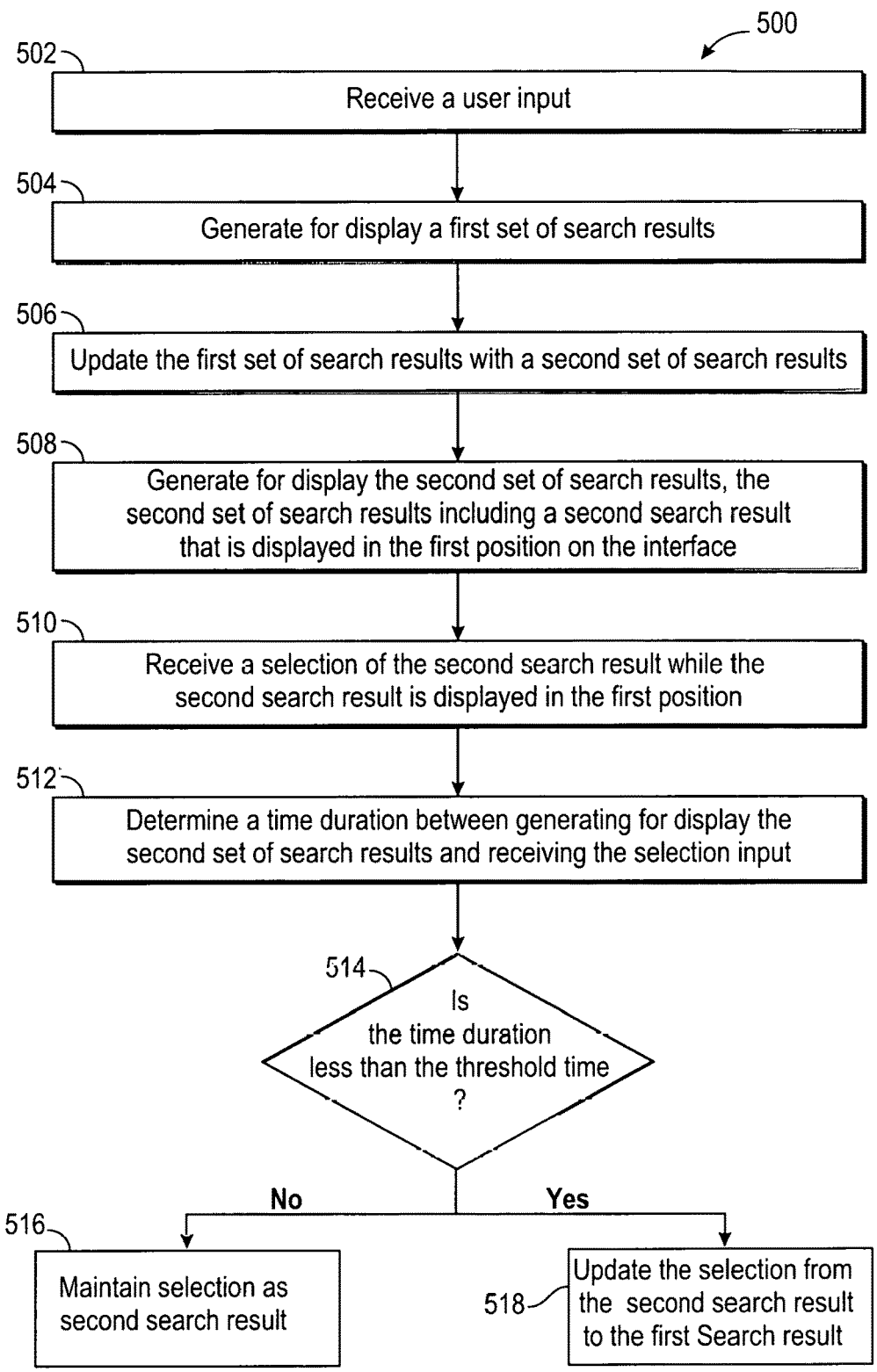
FIG. 5 is a flowchart of an illustrative process for determining a user selection of a search result, in accordance with some embodiments of the disclosure.

FIG. 5 is a flowchart of an illustrative process 500 for determining a user selection of a search result, in accordance with some embodiments of the disclosure. The process 500 may provide stability to systems that display search results on an interface asynchronously. It should be noted that process 500 or any step thereof could be performed on, or provided by, any of the devices shown in FIGS. 1-4. For example, process 500 may be executed by control circuitry 304 (FIG. 3) as instructed by a search application implemented on user equipment 300. In addition, one or more steps of process 500 may be incorporated into or combined with one or more steps of any other process or embodiment (e.g., as described in relation to FIGS. 6-12). Many elements of process 500 have been described above with respect to FIGS. 1A, 1B, 2A, and 2B, and those descriptions have full force and effect with respect to the below description of process 500, and thus details on previously described elements are omitted for the sake of brevity.

At 502, control circuitry 304, such as 402, 404, or 406, receives, on a user equipment, a user input. For example, the control circuitry 304 may receive user input from a user using interface 310. In some embodiments, display 312 may be a touchscreen or touch-sensitive display, and the user input interface 310 may be integrated with or combined with display 312. In response to receiving the user input, at 504, control circuitry 304 generates for display on an interface a first set of search results. In some embodiments, control circuitry 304 may generate a search query based on the user input and may search, for example, local storage 308 for media assets based on the search query. In some embodiments, control circuitry 304 may communicate, via communication circuitry, with a remote data source to obtain additional search results based on the search query. Control circuitry 304 may generate an interface, e.g., interface 100, on display 312 to display the search results. Each of the first set of search results may be displayed within a respective position of a plurality of positions on the interface, e.g., interface 100, that is displayed on display 312. The first set of search results may include a first search result that is displayed in a first position of the plurality of positions.

At 506, control circuitry 304 updates the selection from the first set of search results to the second set of search results. In some embodiments, control circuitry 304 merges the first and second sets of search results. In some embodiments, the search results may be stored in an array, dictionary, or list; the control circuitry 304 may merge the first and second sets of search results by combining two arrays, or by adding entries from a second dictionary or list to a first dictionary or list. In some embodiments, the control circuitry 304 may communicate, via communication circuitry, with a remote server such as search data source 418, for media assets based on the search query. In some embodiments, the control circuitry 304 may search local storage 308 to obtain additional search results based on the search query.

At 508, control circuitry 304 generates for display on the interface the second set of search results. For example, the control circuitry 304 may modify the interface, e.g., interface 100, on the display 312 to display the second set of search results. The second set of search results may include a second search result that is displayed in the first position of the plurality of positions.

At 510, control circuitry 304 receives, on the user equipment, a selection of the second search result of the second set of search results, while the second search result is displayed in the first position. For example, the control circuitry 304 may receive the user selection input via the input interface 310. In cases in which the display is a touchscreen or touch-sensitive display, in order to make a selection of one of the search results, the user may touch with his/her finger on the display 312 a graphical icon representing the search result.

At 512, control circuitry 304 may determine a time duration between generating for display the second set of search results and receiving the selection input. For example, the user equipment 300 may include an internal clock, and control circuitry 304 may determine the time duration based on information received from the internal clock. For example, control circuitry 304 may receive timestamps from the internal clock when functions are carried out by the control circuitry 304. For example, the internal clock may provide a timestamp when control circuitry 304 generates for display the second set of search results. The internal clock may provide another timestamp when control circuitry receives the selection of the second search result. The timestamps may be stored in storage 308, e.g., in association with information identifying functions carried out at respective times, and usable by the control circuitry 304 to determine the time duration. Additionally or alternatively, in response to the control circuitry 304 generating for display the second set of search results, an internal clock may start running. The internal clock may stop running in response to the control circuitry 304 receiving the selection of the second search result. Control circuitry 304 may receive information from and/or analyze the internal clock to determine the time duration. Any other suitable method for establishing the time duration may be utilized, in addition to or in the alternative to those discussed herein.

At 514, control circuitry 304 determines whether the time duration is less than a threshold time. If the time duration is not less than the threshold time, then at 516, the control circuitry 304 determines that the user selection is the second search result. If the time duration is less than the threshold time, then at 518, the control circuitry 304 updates the selection from the second search result to the first search result. For example, control circuitry 304 may modify a data structure representing the selection to indicate that the first search result is selected.

Figure 6:
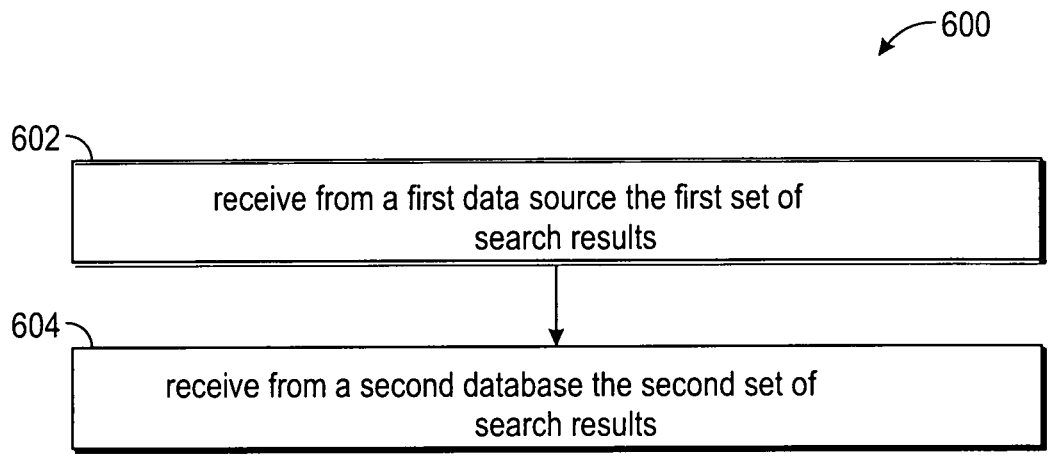
FIG. 6 is a flowchart of an illustrative process for receiving first and second sets of search results in accordance with some embodiments of the disclosure.

FIG. 6 is a flowchart of an illustrative process 600 for receiving first and second sets of search results, in accordance with some embodiments of the disclosure. It should be noted that process 600 or any step thereof could be performed on, or provided by, any of the devices shown in FIGS. 1-4. For example, process 600 may be executed by control circuitry 304 (FIG. 3) as instructed by a search application implemented on user equipment 300. In addition, one or more steps of process 600 may be incorporated into or combined with one or more steps of any other process or embodiment (e.g., as described in relation to FIGS. 5 and 7-12). In some embodiments, control circuitry 304 continues after 502, as described above with reference to FIG. 5, with process 600. Many elements of process 600 have been described above with respect to FIGS. 1A, 1B, 2A, and 2B, and those descriptions have full force and effect with respect to the below description of process 600, and thus details on previously described elements are omitted for the sake of brevity.

At 602, control circuitry 304 receives from a first data source the first set of search results. The first data source may be any suitable type of data source. In some embodiments, the first data source is a local data source, such as local storage 308. The control circuitry 304 may generate a search query based on the user input and may search, for example, local storage 308 for media assets based on the search query. At 604, control circuitry 304 receives from a second data source the second set of search results. The second data source may be different from (e.g., separate from) the first data source. In some embodiments, the second data source is remote from the user equipment 300. For example, the second data source may be a remote server, such as search data source 418. Control circuitry 304 may communicate, via communication circuitry, with a remote data source, e.g., search data source 418, to obtain the second set of search results.

Figure 7:
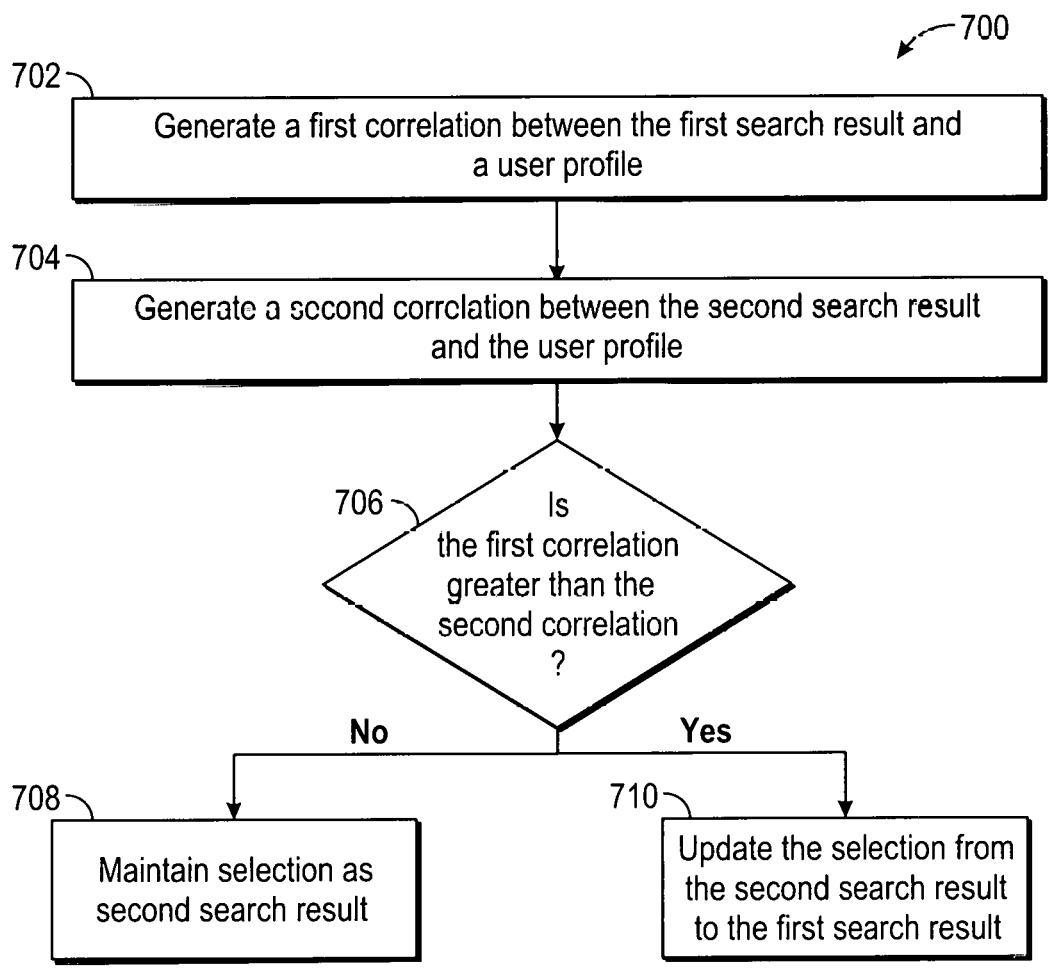
FIG. 7 is a flowchart of an illustrative process for updating a selection from a second search result to a first search result in accordance with some embodiments of the disclosure.

FIG. 7 is a flowchart of an illustrative process 700 for updating a selection from a second search result to a first search result, in accordance with some embodiments of the disclosure. It should be noted that process 700 or any step thereof could be performed on, or provided by, any of the devices shown in FIGS. 1-4. For example, process 700 may be executed by control circuitry 304 (FIG. 3) as instructed by a search application implemented on user equipment 300. In addition, one or more steps of process 700 may be incorporated into or combined with one or more steps of any other process or embodiment (e.g., as described in relation to FIGS. 5, 6 and 8-12). In some embodiments, control circuitry 304 continues after 514, as described above with reference to FIG. 5, with process 700. Many elements of process 700 have been described above with respect to FIGS. 1A, 1B, 2A, and 2B, and those descriptions have full force and effect with respect to the below description of process 700, and thus details on previously described elements are omitted for the sake of brevity.

At 702, control circuitry 304 generates a first profile correlation between the first search result and a user profile. Control circuitry 304 may receive user profile information that is stored in local storage 308. Additionally or alternatively, control circuitry 304 may communicate, via communication circuitry, with a remote data source, e.g., search data source 418, to receive user profile information. At 704, control circuitry 304 generates a second profile correlation between the second search result and the user profile. In correlating the first and second search results, the control circuitry 304 may use any suitable type of user profile information, such as location, age, gender, media interests, education, friend connections, occupation, etc.

At 706, control circuitry 304 determines whether the first correlation is greater than the second correlation. Control circuitry 304 may determine the magnitudes of correlation by any suitable technique. In some embodiments, control circuitry 304 may implement machine learning to determine the magnitudes of correlation. In some embodiments, control circuitry 304 may determine how many keywords in each of the first and second search results match or correspond to keywords in the user profile. In some embodiments, the first and second search results may each have an associated description, and the control circuitry 304 may parse each of the associated descriptions for keywords. If control circuitry 304 determines that the first correlation is not greater than the second correlation (e.g., that the first search result has fewer keywords that match the user profile than the second search result), then at 708, control circuitry 304 maintains the selection as the second search result. If control circuitry 304 determines that the first correlation is greater than the second correlation (e.g., that the first search result has more keywords that match the user profile than the second search result), then at 710, control circuitry 304 updates the selection from the second search result to the first search result.

Figure 8:
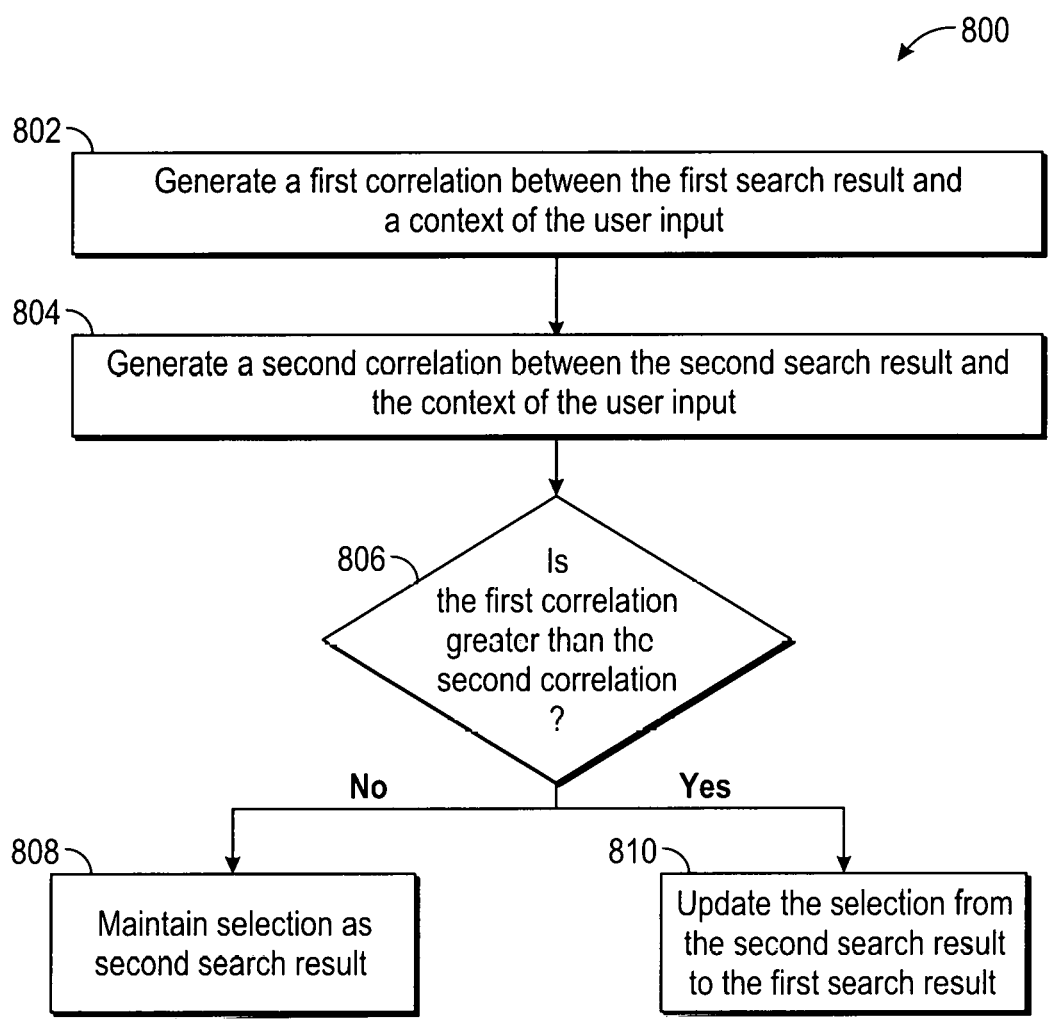
FIG. 8 is another flowchart of an illustrative process for updating a selection from a second search result to a first search result in accordance with some embodiments of the disclosure.

FIG. 8 is a flowchart of an illustrative process for updating a selection from a second search result to a first search result, in accordance with some embodiments of the disclosure. It should be noted that process 800 or any step thereof could be performed on, or provided by, any of the devices shown in FIGS. 1-4. For example, process 800 may be executed by control circuitry 304 (FIG. 3) as instructed by a search application implemented on user equipment 300. In addition, one or more steps of process 800 may be incorporated into or combined with one or more steps of any other process or embodiment (e.g., as described in relation to FIGS. 5-7, 9-12). In some embodiments, control circuitry 304 continues after 514, as described above with reference to FIG. 5, with process 800. Many elements of process 800 have been described above with respect to FIGS. 1A, 1B, 2A, and 2B, and those descriptions have full force and effect with respect to the below description of process 800, and thus details on previously described elements are omitted for the sake of brevity.

At 802, control circuitry 304 generates a first context correlation between the first search result and a context of the user input. Control circuitry 304 may receive context information that is stored in local storage 308. Additionally or alternatively, control circuitry 304 may communicate, via communication circuitry, with a remote data source, e.g., search data source 418, to receive context information. Context information may be indicative of a context of the user input (e.g., input 106 shown in FIGS. 1A and 1B) that the control circuitry 304 received via input interface 310. For instance, the context of the user input may include previous user input that control circuitry 304 received via 310 within a predetermined time before receiving the user input. At 804, control circuitry 304 generates a second context correlation between the second search result and the context of the user input. At 806, control circuitry determines whether the first context correlation is greater than the second context correlation. Control circuitry 304 may determine the magnitudes of context correlation by any suitable technique. In some embodiments, control circuitry 304 may implement machine learning to determine the magnitudes of correlation. In some embodiments, control circuitry 304 may determine how many keywords in each of the first and second search results match or correspond to keywords in the previous user input. In some embodiments, the first and second search results may each have an associated description, and the control circuitry 304 may parse each of the associated descriptions for keywords. If, at 806, control circuitry 304 determines that the first correlation is not greater than the second correlation (e.g., that the first search result has fewer keywords that match the previous user input than the second search result), then at 808, control circuitry 304 maintains the selection as the second search result. If, at 806, control circuitry 304 determines that the first correlation is greater than the second correlation (e.g., that the first search result has more keywords that match the previous user input than the second search result), then at 710, control circuitry 304 updates the selection from the second search result to the first search result. For example, control circuitry 304 determines that although the user selected, via interface 310, the second search result, the user intended to select, via interface 310, the first search result.

Figure 9:
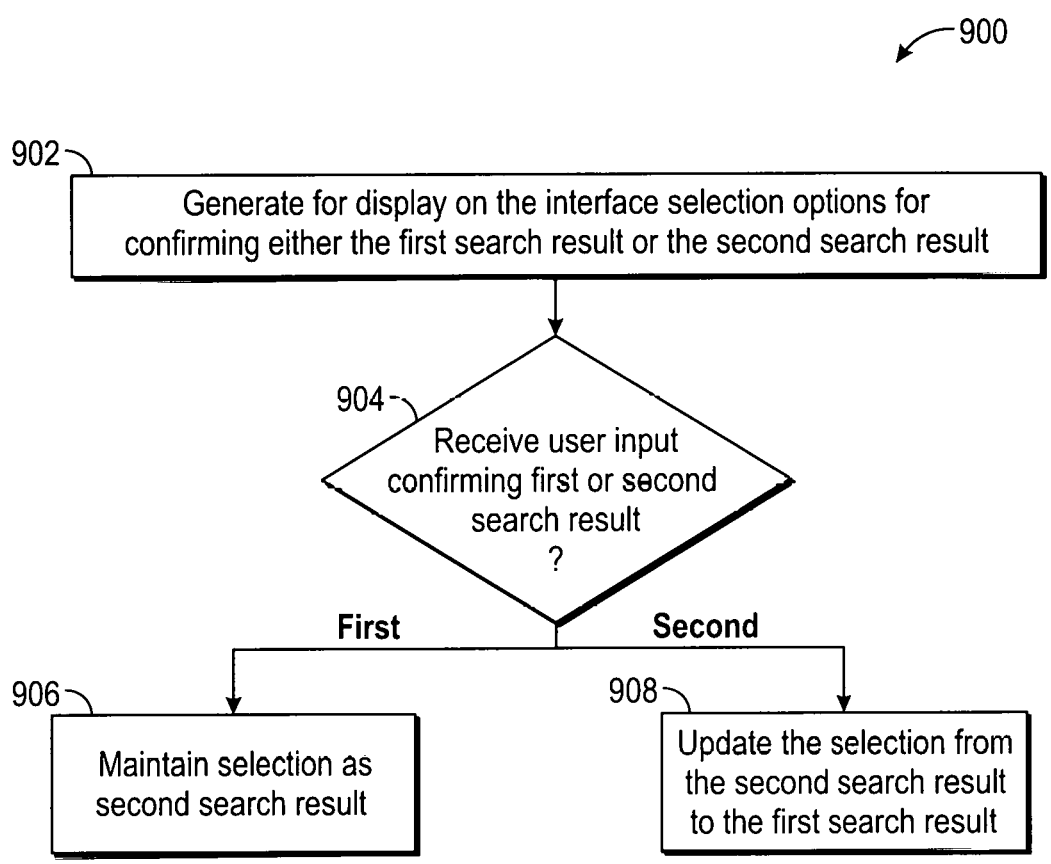
FIG. 9 is a flowchart of an illustrative process for determining an intended user selection in accordance with some embodiments of the disclosure.

FIG. 9 is a flowchart of an illustrative process 900 for determining an intended user selection in accordance with some embodiments of the disclosure. It should be noted that process 900 or any step thereof could be performed on, or provided by, any of the devices shown in FIGS. 1-4. For example, process 900 may be executed by control circuitry 304 (FIG. 3) as instructed by a search application implemented on user equipment 300. In addition, one or more steps of process 900 may be incorporated into or combined with one or more steps of any other process or embodiment (e.g., as described in relation to FIGS. 5-8 and 10-12). In some embodiments, control circuitry 304 continues after 514, as described above with reference to FIG. 5, with process 900. Many elements of process 900 have been described above with respect to FIGS. 1A, 1B, 2A, and 2B, and those descriptions have full force and effect with respect to the below description of process 900, and thus details on previously described elements are omitted for the sake of brevity.

At 902, control circuitry 304 generates for display on an interface selection options for confirming either the first search result or the second search result. At 904, control circuitry 304 determines whether it has received user input confirming the first search result or the second search result. For example, control circuitry 304 may monitor for user input via input interface 310. In cases in which display 312 is a touchscreen or touch-sensitive display, and input interface 310 is integrated with display 312, control circuitry 304 may monitor input interface 310 for information indicating that a user has touched a portion of the display 312 to indicate confirmation of the first or second search result. If, at 904, control circuitry 304 receives, via input interface 310, input indicating confirmation of the second search result, then at 906, control circuitry 304 maintains the selection of the second search result. For example, control circuitry 304 determines that the user intended to select the second search result. If, at 904, control circuitry 304 receives, via input interface 310, input confirming the first search result, then at 908, control circuitry 304 updates the selection from the second search result to the first search result. For example, it is determined that although the user selected the second search result, the user intended to select the first search result.

Figure 10:
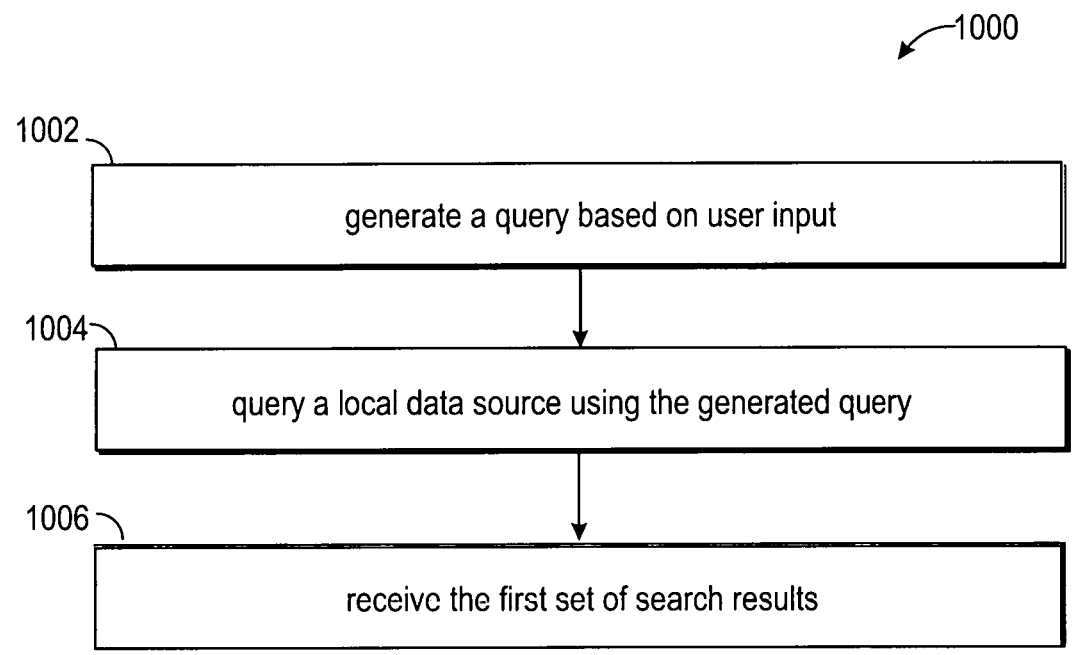
FIG. 10 is a flowchart of an illustrative process for receiving a first set of search results, in accordance with some embodiments of the disclosure.

FIG. 10 is a flowchart of an illustrative process 1000 for receiving a first set of search results, in accordance with some embodiments of the disclosure. It should be noted that process 1000 or any step thereof could be performed on, or provided by, any of the devices shown in FIGS. 1-4. For example, process 1000 may be executed by control circuitry 304 (FIG. 3) as instructed by a search application implemented on user equipment 300. In addition, one or more steps of process 1000 may be incorporated into or combined with one or more steps of any other process or embodiment (e.g., as described in relation to FIGS. 5-9, 11, and 12). Many elements of process 1000 have been described above with respect to FIGS. 1A, 1B, 2A, and 2B, and those descriptions have full force and effect with respect to the below description of process 1000, and thus details on previously described elements are omitted for the sake of brevity.

At 1002, control circuitry 304 generates a query based on user input. Control circuitry 304 may receive the user input on user equipment via input interface 310. Control circuitry 304 may generate the query using the user input. In some embodiments, the search application formulates a query, e.g., a SQL Select statement, that requests records from the local data source that correspond to the user input. Control circuitry 304 may search a local data source, for example, local storage 308, for search results based on the search query. At 1004, control circuitry 304 receives the first set of search results, for example, from the local storage 308.

Figure 11:
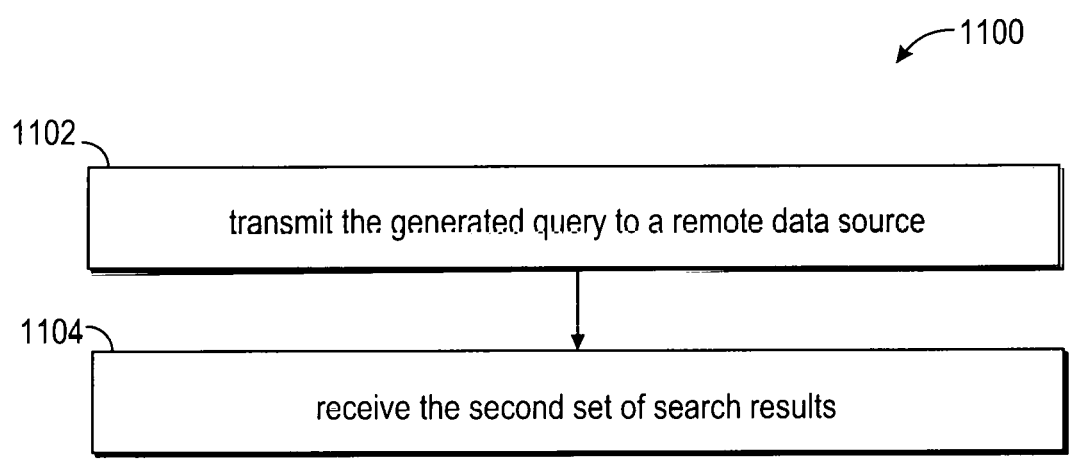
FIG. 11 is another flowchart of an illustrative process for receiving a first set of search results, in accordance with some embodiments of the disclosure.

FIG. 11 is a flowchart of an illustrative process 1100 for receiving a first set of search results, in accordance with some embodiments of the disclosure. It should be noted that process 1100 or any step thereof could be performed on, or provided by, any of the devices shown in FIGS. 1-4. For example, process 1100 may be executed by control circuitry 304 (FIG. 3) as instructed by a search application implemented on user equipment 300. In addition, one or more steps of process 1000 may be incorporated into or combined with one or more steps of any other process or embodiment (e.g., as described in relation to FIGS. 5-10 and 12). Many elements of process 1100 have been described above with respect to FIGS. 1A, 1B, 2A, and 2B, and those descriptions have full force and effect with respect to the below description of process 1100, and thus details on previously described elements are omitted for the sake of brevity.

At 1102, control circuitry 304 transmits a generated query to a remote data source. Control circuitry 304 may receive the user input on user equipment 300 via input interface 310. Control circuitry 304 may generate the query using the user input. In some embodiments, the search application formulates a query, e.g., a SQL Select statement, that requests records from the local data source that correspond to the user input. At 1104, control circuitry receives a second set of search results from the remote data source.

Figure 12:
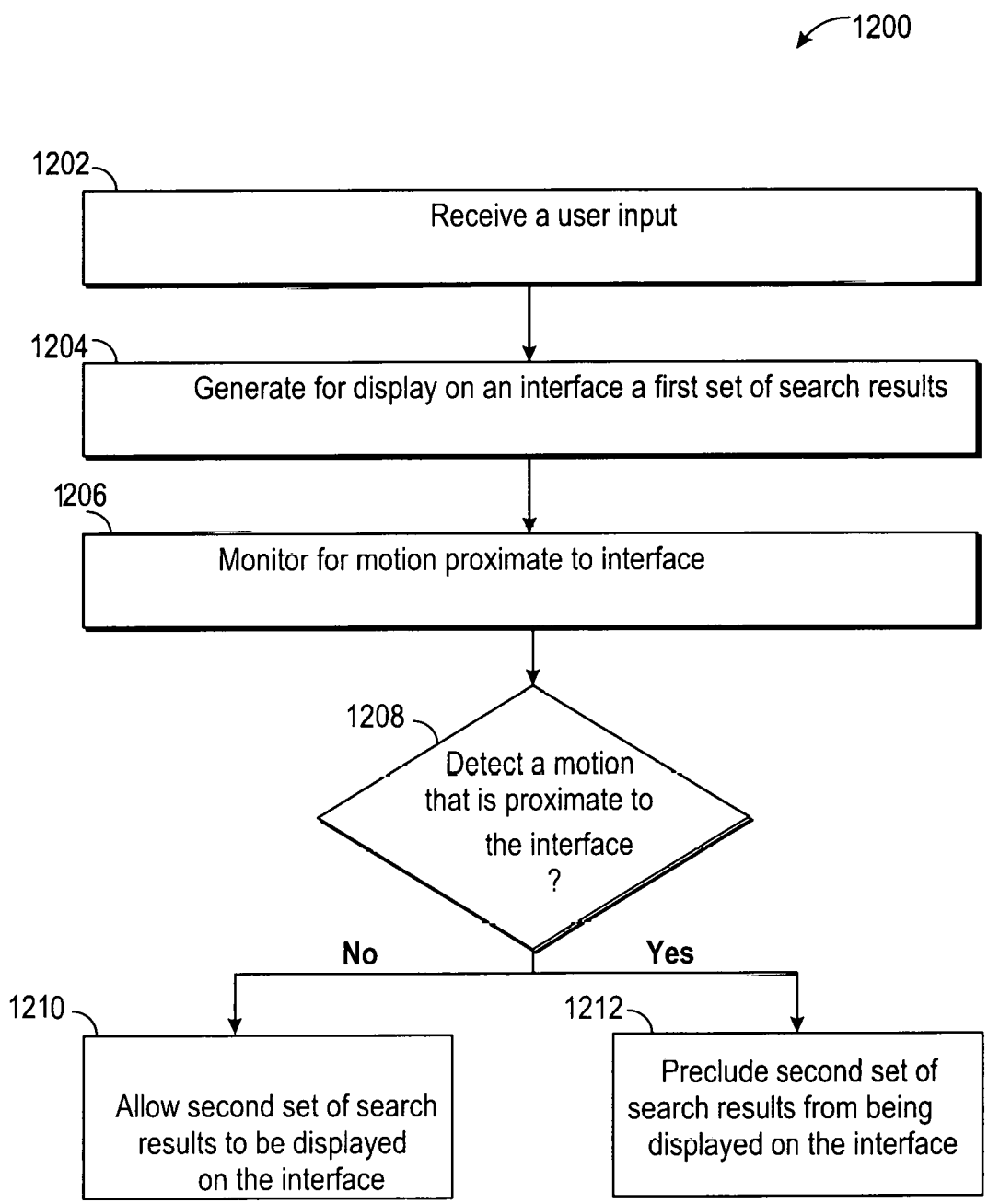
FIG. 12 is a flowchart of an illustrative process for providing stability to systems that display search results on an interface asynchronously, in accordance with some embodiments of the disclosure.

FIG. 12 is a flowchart of an illustrative process 1200 for providing stability to systems that display search results on an interface asynchronously, in accordance with some embodiments of the disclosure. Process 1200 may monitor motion (e.g., movement of a user's finger) near the interface to prevent inadvertent user selection of a search result. It should be noted that process 1200 or any step thereof could be performed on, or provided by, any of the devices shown in FIGS. 1-4. For example, process 1200 may be executed by control circuitry 304 (FIG. 3) as instructed by a search application implemented on user equipment 300. In addition, one or more steps of process 1200 may be incorporated into or combined with one or more steps of any other process or embodiment (e.g., as described in relation to FIGS. 5-11). Many elements of process 1200 have been described above with respect to FIGS. 1A, 1B, 2A, and 2B, and those descriptions have full force and effect with respect to the below description of process 1200, and thus details on previously described elements are omitted for the sake of brevity.

At 1202, control circuitry 304 receives, on a user equipment, user input. For example, control circuitry 304 may receive user input from a user using input interface 310. In response to receiving the user input, at step 1204, control circuitry 304 generates for display on an interface a first set of search results. In some embodiments, control circuitry 304 may generate a search query based on the user input and may search, for example, local storage 308 for media assets based on the search query. In some embodiments, control circuitry 304 may communicate, via communication circuitry, with a remote data source to obtain additional search results based on the search query. Control circuitry 304 may generate an interface, e.g., interface 100, on display 312 to display the search results. Each of the first set of search results may be displayed within a respective position of a plurality of positions on the interface, e.g., interface 100, displayed on display 312.

As explained above, user frustration and system inefficiencies arise when systems modify an interface (e.g., by replacing a first set of search results with a second set of search results) as the user is about to select one of the first set of search results. Thus, at 1206, control circuitry 304 monitors for motions that are proximate to (within a predetermined distance from) the interface within a predetermined time after generating for display the first set of search results, since such motions may indicate that the user is moving to select one of the first set of search results.

Control circuitry 304 may be configured to monitor for motions indicative of an object, such as a user's finger, moving within a predetermined distance from surface of the display 312 that is displaying the interface (e.g., within a centimeter from the surface of the display 312). In some embodiments, control circuitry 304 may be configured to monitor for an object approaching the surface of the display 312.

Control circuitry 304 may determine the predetermined distance in any suitable way, for example, by receiving the information from a database, through user configuration settings, through parameters that are hard-coded in the search application, through machine learning techniques, etc. Control circuitry 304 may monitor for motions that are proximate to (within a predetermined distance from) the interface by receiving information from a sensing system. A sensing system may comprise any suitable type and suitable number of sensors for detecting presence of nearby objects and/or motion thereof.

The sensing system may include one or more proximity sensors, such as capacitive, magnetic, and/or optical sensors. For example, proximity sensors may be integrated into the display 312 and configured to detect presence of an object (e.g., a user's finger) proximate thereto. In some embodiments, the display 312 may include a plurality of proximity sensors that are configured to detect presence of a nearby object at various locations across the interface, e.g., as the object moves near the surface of the display. Control circuitry 304 may detect, in response to receiving proximity information from the proximity sensors, that the object is moving proximate to (within a predetermined distance from) the interface.

Additionally or alternatively, the sensing system may include one or more motion sensors, such as optical sensors and/or gesture sensors. For example, motion sensors may be integrated into the display 312 and configured to detect movement of a nearby object (e.g., a user's finger). Control circuitry 304 may detect, in response to receiving motion information from one or more of the motion sensors, that an object is approaching the interface (e.g., moving within a predetermined distance from and in a direction towards the interface.)

The control circuitry 304 may be configured to monitor for and detect any suitable type of motion that is proximate to (e.g., within a predetermined distance of) the interface. For example, control circuitry 304 may be configured to monitor and detect movement of an object within one centimeter (e.g., one millimeter) of the interface. In some embodiments, the predetermined distance may be hard-coded in the search application. In some embodiments, the control circuitry 304 may modify or adapt the predetermined distance. For instance, in some embodiments, control circuitry 304 may modify the predetermined distance in response to receiving user preferences, e.g., through configuration settings. In some embodiments, control circuitry 304 may modify the predetermined distance through implementing machine learning techniques. For example, control circuitry 304 may train models to learn a predetermined distance from the interface at which detected motion is indicative of a user selecting a search result.

In some embodiments, control circuitry 304 is configured to detect an object moving proximate to the interface and moving in any direction relative to the interface. In some embodiments, control circuitry 304 may be configured to detect a particular type of motion, for example, motion that is indicative of an object moving in a particular direction relative to the interface (e.g., in a particular direction relative to the display 312). For example, control circuitry 304 may be configured to detect that an object is moving across and substantially parallel to the surface of the display 312. As another example, control circuitry 304 may be configured to detect that an object is approaching (moving towards) the interface (e.g., in a direction that is substantially perpendicular to the surface of the display 312). In some embodiments, control circuitry 304 may implement machine learning techniques to determine motion that is moving towards the interface. For example, control circuitry 304 may train models to learn to determine whether a detected motion is indicative of a user selecting a search result.

At 1208, control circuitry 304 determines whether it has detected motions proximate to the interface. For example, control circuitry 304 may determine whether it has received, from the sensing system, information indicating that an object moved within a predetermined distance from the interface.

If, at 1208, control circuitry 304 does not detect motions proximate to the interface within a predetermined time after generating for display on the interface the first set of search results, then at 1210, control circuitry 304 allows a second set of search results to be displayed on the interface. If, at 1208, control circuitry 304 does detect motions proximate to the interface within a predetermined time after generating for display on the interface the first set of search results, then at 1212, control circuitry 304 precludes the second set of search results from being displayed on the interface. For example, detection of a motion proximate to the interface (e.g., approaching the interface) may indicate that a user is making a selection of one of the first set of search results. For instance, the detected motion may likely be the user's finger moving to make a selection on the interface. Thus, in response to detecting the motion within the predetermined time, control circuitry 304 precludes modification of the user interface, (e.g., replacing the first set of search results with the second set of search results). Thus, control circuitry 304 causes the system to stabilize the interface when the search results are received asynchronously.

In some embodiments, each of the first set of search results is displayed in a respective position of a plurality of positions on the interface, and the control circuitry monitors for motions proximate to one of the plurality of positions. Suppose the user touches a different area of the interface that is separate from the plurality of positions, to carry out functions unrelated to the search results. The control circuitry 304 may be refrain from monitoring motions around the different portion (e.g., motions that are not proximate to the plurality of positions) so that the user activity in the different portion does not affect the determination of whether to preclude display of the second set of search results.

In some embodiments, in response to receiving the user input through input interface 310, the control circuitry 304 may generate a query based on the user input. The control circuitry 304 may query at least one data source using the generated query. In some embodiments, control circuitry 304 may generate a search query based on the user input and may search, for example, local storage 308 for media assets based on the search query. Control circuitry 304 may generate an interface, e.g., interface 100, on display 312 to display the first set of search results.

In some embodiments, control circuitry 304 may transmit, via communication circuitry, the generated query to query a remote data source, such as search data source 418, for search results based on the search query. The control circuitry 304 may receive, via communication circuitry, the second set of search results from the remote data source 418 based on the generated query. In such cases, the control circuitry 304 may receive the second set of search results but preclude, in response to detecting motion proximate to the interface, display of the second set of search results on the interface.

It is contemplated that the steps or descriptions of each of FIGS. 5-12 may be used with any other embodiment of this disclosure. In addition, the steps and descriptions described in relation to FIGS. 5-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIGS. 5-12.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for determining an intended user selection of a search result, the method comprising:
   receiving, on a user equipment, a user input;
   in response to receiving the user input, generating, for display on a user interface, a first set of search results, wherein each of the first set of search results is displayed within a respective position of a plurality of positions on the user interface, and wherein the first set of search results includes a first search result that is displayed in a first position of the plurality of positions;
   generating, for display on the user interface, a second set of search results comprising a second search result;
   replacing, on the user interface, the first search result in the first position with the second search result;
   receiving, on the user equipment, a selection input including a selection of the second search result while the second search result is displayed in the first position;

determining a time duration between generating for display the second set of search results and receiving the selection input;

determining whether the time duration is less than a threshold time; and in response to determining that the time duration is less than the threshold time, updating the selection from the second search result to the first search result.

2. The method of claim 1, further comprising:

generating a query based on the user input;

querying a local data source using the generated query; and receiving, in response to querying the local data source, the first set of search results.

3. The method of claim 2, further comprising:

transmitting the generated query to a remote data source; and receiving, in response to transmitting the generated query to the remote data source, the second set of search results.

4. The method of claim 1, further comprising:

generating a first correlation between the first search result and a user profile;

generating a second correlation between the second search result and the user profile;

determining that the first correlation is greater than the second correlation; and modifying a data structure representing the selection to indicate that the first search result is selected.

5. The method of claim 1, further comprising:

generating a first correlation between the first search result and a context of the user input, the context of the user input comprising previous user input that was received by the user equipment within a predetermined time before receiving the user input;

generating a second correlation between the second search result and the context of the user input;

determining that the first correlation is greater than the second correlation; and modifying a data structure representing the selection to indicate that the first search result is selected.

6. The method of claim 1, further comprising:

generating, for display on the user interface, selection options for confirming whether the user intended to select either the first search result or the second search result; and receiving user input confirming the user intended to select the first search result.

7. A method for preventing inadvertent user selection of a search result, the method comprising:

receiving, on a user equipment, a user input;

generating a query based on the user input;

querying at least one data source using the generated query;

receiving a first set of search results from the at least one data source based on the generated query, first set of search results comprising a first search result;

generating, for display on a user interface, the first set of search results, wherein each of the first set of search results is displayed within a respective position of a plurality of positions on the user interface, and wherein the first search result is displayed in a first position of the plurality of positions;

monitoring for a motion proximate to the user interface; and in response to detecting a motion proximate to the user interface within a predetermined time after generating for display on the user interface the first set of search results, precluding a second set of search results comprising a second search result, based on the query, from being displayed on the user interface where the second search result would replace the first search result displayed in the first position.

8. The method of claim 7, further comprising monitoring for motion approaching the user interface.

9. The method of claim 7, wherein the at least one data source comprises a local data source and a remote data source, and wherein the first set of search results is received from the local data source, the method further comprising:

transmitting the generated query to the remote data source; and receiving the second set of search results from the remote data source based on the generated query.

10. The method of claim 7, wherein each of the first set of search results is displayed in a respective position of a plurality of positions on the user interface, and the monitoring for motions proximate to the user interface comprises monitoring for motions proximate to one of the plurality of positions.

11. A system for determining an intended user selection of a search result, the system comprising:

control circuitry configured to:

receive a user input;

in response to receiving the user input, generate, for display on a user interface, a first set of search results, wherein each of the first set of search results is displayed within a respective position of a plurality of positions on the user interface, and wherein the first set of search results includes a first search result that is displayed in a first position of the plurality of positions;

replace, on the user interface, the first search result in the first position with the second search result;

generate, for display on the user interface, a second set of search results comprising a second search result;

receive a selection input including a selection of the second search result while the second search result is displayed in the first position;

determine a time duration between generating for display the second set of search results and receiving the selection input;

determine whether the time duration is less than a threshold time; and update, in response to determining that the time duration is less than the threshold time, the selection from the second search result to the first search result.

12. The system of claim 11, wherein the control circuitry is further configured to:

generate a query based on the user input;

query a local data source using the generated query; and receive, in response to querying the local data source, the first set of search results.

13. The system of claim 12, wherein control circuitry is further configured to:

transmit, using communication circuitry, the generated query to a remote data source; and receive, using the communication circuitry, the second set of search results.

14. The system of claim 11, wherein the control circuitry is further configured to:

generate a first correlation between the first search result and a user profile;

generate a second correlation between the second search result and the user profile;

determine that the first correlation is greater than the second correlation; and modify a data structure representing the selection to indicate that the first search result is selected.

15. The system of claim 11, wherein the control circuitry is further configured to:

generate a first correlation between the first search result and a context of the user input, the context of the user input comprising previous user input that was received by the user equipment within a predetermined time before receiving the user input;

generate a second correlation between the second search result and the context of the user input;

determine that the first correlation is greater than the second correlation; and modify a data structure representing the selection to indicate that the first search result is selected.

16. The system of claim 11, wherein the control circuitry is further configured to:

generate, for display on the user interface, selection options for confirming whether the user intended to select either the first search result or the second search result; and receive user input confirming the user intended to select the first search result.

17. A system for preventing inadvertent user selection of a search result, the system comprising:

control circuitry configured to:
receive, on a user equipment, a user input;
generate a query based on the user input;
query at least one data source using the generated query;
receive a first set of search results from the at least one data source based on the generated query, first set of search results comprising a first search result;
generate, for display on a user interface, the first set of search results, wherein each of the first set of search results is displayed within a respective position of a plurality of positions on the user interface, and wherein the first search result is displayed in a first position of the plurality of positions;
monitor for a motion proximate to the user interface; and
in response to detecting a motion proximate to the user interface within a predetermined time after generating for display on the user interface the first set of search results, preclude a second set of search results comprising a second search result, based on the query, from being displayed on the user interface where the second search result would replace the first search result displayed in the first position.

18. The system of claim 17, wherein the control circuitry is further configured to monitor for motion approaching the user interface.

19. The system of claim 17, wherein the at least one data source comprises a local data data source and a remote data source, and wherein the first set of search results is received from the local data source, and wherein the control circuitry is further configured to:

transmit, using communication circuitry, the generated query to the remote data source; and receive, using communication circuitry, the second set of search results from the remote data source based on the generated query.

20. The system of claim 17, wherein each of the first set of search results is displayed in a respective position of a plurality of positions on the user interface, and the monitoring for motions proximate to the user interface comprises monitoring for motions proximate to one of the plurality of positions.

* * * * *